United States Patent
Suzuki et al.

[11] Patent Number: 6,149,999
[45] Date of Patent: Nov. 21, 2000

[54] METHOD OF DESIGNING A PHASE-CHANGE OPTICAL RECORDING MEDIUM, AND A PHASE-CHANGE OPTICAL RECORDING MEDIUM

[75] Inventors: Toshio Suzuki, Akita; Isao Morimoto, Fuji, both of Japan

[73] Assignee: Asahi Kasei Kogyo Kabushiki Kaisha, Osaka, Japan

[21] Appl. No.: 09/125,980

[22] PCT Filed: Feb. 28, 1997

[86] PCT No.: PCT/JP97/00596

§ 371 Date: Aug. 28, 1998

§ 102(e) Date: Aug. 28, 1998

[87] PCT Pub. No.: WO97/32304

PCT Pub. Date: Sep. 4, 1997

[30] Foreign Application Priority Data

| | | | |
|---|---|---|---|
| Feb. 28, 1996 | [JP] | Japan | 8-041924 |
| Feb. 28, 1996 | [JP] | Japan | 8-041925 |
| Nov. 29, 1996 | [JP] | Japan | 8-318902 |

[51] Int. Cl.$^7$ .................................... B32B 3/00
[52] U.S. Cl. .............. 428/64.1; 428/64.4; 428/64.5; 428/64.6; 428/913; 430/270.13; 430/495.1; 430/945
[58] Field of Search .................. 428/64.1, 64.2, 428/64.4, 64.5, 64.6, 913; 430/270.13, 495.1, 945; 369/283, 288

[56] References Cited

U.S. PATENT DOCUMENTS

| | | |
|---|---|---|
| 5,424,106 | 6/1995 | Yamada et al. . |
| 5,545,454 | 8/1996 | Yamada et al. . |

FOREIGN PATENT DOCUMENTS

| | | |
|---|---|---|
| 0 566 107 A1 | 10/1993 | European Pat. Off. . |
| 0630007 A1 | 12/1994 | European Pat. Off. . |
| 61-258787 | 11/1986 | Japan . |
| 62-53886 | 3/1987 | Japan . |
| 62-241145 | 10/1987 | Japan . |
| 63-217542 | 9/1988 | Japan . |
| 1-149237 | 6/1989 | Japan . |
| 05159360 | 6/1993 | Japan . |
| 5-159360 | 6/1993 | Japan . |
| 5-298748 | 10/1993 | Japan . |
| 8-096411 | 4/1996 | Japan . |
| 10-49914 | 2/1998 | Japan . |
| 63-103453 | 5/1998 | Japan . |
| WO95/26550 A1 | 10/1995 | WIPO . |
| WO96/17344 A1 | 6/1996 | WIPO . |

*Primary Examiner*—Elizabeth Evans
*Attorney, Agent, or Firm*—Birch, Stewart, Kolasch & Birch, LLP

[57] ABSTRACT

A phase-change recording medium having a recording layer (4) made of a Ge—Sb—Te alloy, comprises an interface reflection control layer (3) provided on a laser beam incident side of the recording layer (4). The interface reflection control layer (3) has an extinction coefficient k and a refractive index n, simultaneously satisfying: $k \geq 0.22n+0.14$, $k \leq 0.88n-0.19$, and $n \leq 2.8$. From the foregoing, it follows that the intensity ratio between the reflected wave from and the incident wave on the interface between the recording layer (4) and the interface reflection control layer (3) is led to a specified range.

As a result, for the recording layer (4) the ratio (Ac/Aa) of the light absorption rate (Ac) in the crystalline state to the light absorption rate (Aa) in the amorphous state increases. Furthermore, the optical contrast also has a sufficiently high value. It is therefore possible to produce a high quality readout signal in recording by overwriting.

Further, by providing a heat diffusion layer (7) between the interface reflection control layer (3) and the substrate (1), the mark edge recording at a high recording density can be performed with precision.

11 Claims, 11 Drawing Sheets

METHOD OF DESIGNING A PHASE-CHANGE OPTICAL RECORDING MEDIUM, AND A PHASE-CHANGE OPTICAL RECORDING MEDIUM

This application is the national phase under 35 U.S.C §371 of prior PACT International Application No. PAT/JP97/00596 which has an International filing date of Feb. 28, 1997 which designated the United States of America, the entire contents of which are hereby incorporated by reference.

TECHNICAL FIELD

The present invention is concerned with a phase-change optical recording medium for recording, erasing and reading information by utilizing a reversible phase-change in a recording layer by irradiation of laser beam and, more in particular, it relates to a phase-change optical recording medium capable of recording information at a high density and excellent in recording and erasing characteristics.

BACKGROUND ART

In recent years, along with progress of the semiconductor technology, digitalization of information has been progressed rapidly and, along with digitalization of information, particularly, digitalization of image information such as static or moving picture, the amount of information to be treated has become enormous. In such a situation, it is necessary to store the information temporarily or quasi-permanently. As means for recording the enormous information, optical recording media such as optical discs are considered to be promising and research and development have been conducted vigorously for increasing the capacity.

Particularly, a so-called phase-change optical recording medium, which records and erases information by utilizing a material that conducts reversible phase change between two states, namely, a crystalline state and an amorphous state, is highly expected as an image recording medium, since it has an excellent feature capable of recording and erasing information by a simple optical system and easily so-called overwriting, which conducts recording new information while erasing already recorded information simultaneously.

As a recording material for the phase-change recording medium, chalcogenide alloys such as Ge—Te—Sb series alloys (refer to Japanese Patent Laid-Open Sho 62-53886 and Japanese Patent Laid-Open Sho 61-258787), In—Sb—Te alloys (refer to Japanese Patent Laid-Open Sho 62-241145) or oxide series materials such as Te—Ge—Sn—O have been used mainly. Upon overwriting, a portion of a recording layer irradiated by a laser beam with a recording power is made amorphous by being heated to higher than the melting point and then quenched to form a recording mark, whereas a portion of the recording layer irradiated by a laser beam with an erasing power is crystallized to erase the recording mark by being heated to higher than the crystallizing temperature.

When recording and erasing of information are actually conducted by using the recording material described above, a protection layers are usually located just beneath and just above the recording layer for preventing the recording layer from oxidation or deformation. Further, a structure of disposing a reflection layer through a protection layer on a recording layer is often used as a more preferred layer structure for picking up an optical change in the recording layer as a great change of reflectance by utilizing the interference effect of light.

As the material for the protection layer, oxides, carbides, nitrides, flouorides and sulfides of metals or semimetals, and the like have been known and, among them, ZnS has been known to provide a strong adhesion with the recording layer. However, a protection layer consisting only of ZnS was insufficient for the heat resistance since crystalline grains of ZnS becomes coarser by repetitive recording and erasing by overwriting. Japanese Patent Laid-Open Sho 63-103453 discloses an optical disc enhanced with the heat resistance of the protection layer and improved with respect to deterioration of cyclability caused by thermal deformation or the like of the recording layer, by the addition of a glass-forming material such as $Sio_2$ to ZnS. Such existent material for the protection layer as described above is usually transparent to a light used for recording, erasing and reading.

On the other hand, as a method of increasing the recording density, in a case of existent mark position recording of corresponding a recording signal to a central position of a recording mark, there is a method of increasing the density in the direction of a recording track (linear density) and the density in the direction vertical to the recording track (track density) by reducing the size of recording marks so as to bring the spaced recording marks closer to each other.

Further, mark edge recording of corresponding a recording signal to the position for the leading end and the trailing end of a recording mark can increase the recording density in the track direction by about 1.5 times compared with the mark position recording for the recording mark of an identical size, so that the recording density can be increased by conducting the mark edge recording instead of the mark position recording.

In the case of increasing the density in the mark position recording, it is necessary to shorten the wavelength of a light source for recording in order to greatly reduce the size of the recording mark, whereas the mark edge recording provides a merit capable of increasing the density without substantial alteration of an apparatus. However, in a case of recording information by the mark edge method, it is necessary to form a recording mark precisely with a constant width at a predetermined position.

In such an existent phase-change recording medium, since the absorption factor for the laser beam in a crystalline state is lower than the absorption factor for the laser beam in an amorphous state and, in addition, the heat conductivity is higher and diffusion of heat generated is larger in the crystalline state, a portion in the amorphous state was heated to a higher temperature compared with a portion in the crystalline state even when a laser beam with an identical intensity was irradiated. Namely, there was a phenomenon that the temperature elevation was different depending on the preceding state whether it was in the crystalline state or in the amorphous state even when a laser beam with an identical intensity was irradiated. If the temperature elevation was different as described above, it resulted in a problem that the width of the marks to be formed was not uniform, or the mark forming position was displaced from a normal position.

As a means for solving the foregoing, it is disclosed, for example, in Japanese Patent Laid-Open Hei 1-149238 that the light absorption rate in the crystalline state of the recording layer (hereinafter referred to as [Ac]) is made equal with or higher than the light absorption rate in the amorphous state (hereinafter referred to as [Aa]). For this method, it is mentioned to properly select the thickness for each of the layers constituting the phase-change optical recording medium. Specifically, it is disclosed an example of increasing the ratio (Ac/Aa) between the crystallized state and the amorphous state with respect to the light absorption rate to about 1.1 by reducing the thickness of a metal reflection layer than usual and changing the thickness of the protection layers just above and just beneath the recording layer.

That is, in this method, Aa is kept low by reducing the thickness of the reflection layer to increase the transmitted light therethrough, but increase of the transmittance in the reflection layer involves a problem that each of the performances in recording, erasing and reading is deteriorated since the light returned from the reflection layer as a back surface of the phase-change optical recording medium causes noises upon reading, or cooling performance of the recording layer is lowered due to the reduced thickness of the reflection layer.

Further, the Ge—Te—Sb alloy requires a technique of greatly increasing the ratio (Ac/Aa) of light absorption rate compared with the phase change material of other oxide series. This is considered to be attributable to the change of the values of thermophysical property along with the phase change of the Ge—Te—Sb alloy.

That is, since the property of the Ge—Te—Sb alloy becomes similar as that of metal along with the phase change from the amorphous state to the crystalline state, it is supposed that the change of the thermal conductivity is larger compared with other materials. As a result, it is considered that when a recording mark is formed to a portion in the crystalline state, a higher ratio (Ac/Aa) of light absorption rate is necessary, since a considerably greater amount of heat is necessary compared with a portion in the amorphous state.

In view of the foregoing, in the field of the phase-change optical recording medium, it has been keenly demanded for a designing method for increasing the ratio (Ac/Aa) of light absorption rate in the crystallized state to the light absorption rate in the amorphous state and a technology effective in increasing the ratio (Ac/Aa) of light absorption rate.

In addition, the existent phase-change recording medium involves a problem that each of the performances in the recording, erasing and reading is deteriorated if recording and erasing are repeated by a number of cycles. It is considered that the deterioration of the performance caused by the number of repetitive cycles is due to the following reasons.

Namely, since the intensity distribution of a laser beam has a Gaussian distribution, temperature of elevation and cooling, and change thereof with lapse of time are different between the central portion and the end portion in the area irradiated with a laser beam, and phase separation or segregation of the recording material occurs in the amorphous mark formed. As a result, phase separation or segregation is increased by the repetitive recording and erasing to change the characteristics and shorten the life for repetitive cycles.

Further, when recording and erasing are conducted repetitively, delamination occurs at the interface between the protection layer and the recording layer or the material of the recording layer is fluidized by the stress generated in the protection layer in the course of melting the material of the recording layer during recording to result in local fluctuation of the film thickness, which also leads to deterioration of the life for repetitive cycles.

In order to prevent the degradation of the performance due to repetitive recording and erasing, Japanese Patent Laid-Open Sho 63-217542 discloses that a light absorbing PbS layers is disposed between the recording layer and the protection layer to make the temperature distribution uniform and Japanese Patent Laid-Open Hei 7-262614 discloses that a W (tungsten) layer is disposed between the recording layer and the protection layer to increase the adhesion between them.

However, disposition of the PbS layer or the W layer between the recording layer and the protection layer provides a problem that a difference of the reflectance, namely, an optical contrast between the amorphous state and the crystalline state can not be ensured sufficiently. This problem has not been known so far but is considered to be attributable to a large refractive index of W or PbS.

Furthermore, in the structure of disposing the layer comprising a light absorbing material (light absorption layer) between the recording layer and the protection layer, quenching necessary for making the recording layer amorphous is not conducted due to generation of heat caused by light absorption in the light absorption layer, to result in a worry that no sufficient amorphous state is obtained.

Furthermore, with the reasons as described in (1)–(3) below, in order to increase the recording density, it is necessary to rapidly dissipate the heat generated in the recording layer to the outside of the recording layer after passage of a recording beam.

(1) If the heat generated in the recording layer prevails in the recording layer, since temperature rises within an entire plane of the recording layer, it is difficult to reduce the size of the recording mark.

(2) If the distance between each of the spaced recording marks is decreased, since heat generated upon forming the just preceding mark tends to be transferred as far as the position for forming the just succeeding mark, the position for forming the succeeding mark tends to be displaced from the normal position.

(3) When the heat prevails in the plane of the recording layer, since heat flows from a leading portion of the mark to a trailing mark forming portion, the temperature to be reached is made higher than that at the position for starting the mark formation. As a result, the width at the trailing end of the mark is increased to distort the shape of the mark into a tear drop shape.

As described above, for conducting mark edge recording precisely in a phase-change optical recording medium in which the light absorption layer is disposed between the recording layer and the protection layer (that is, just above and/or just beneath the recording layer), it is necessary to sufficiently diffuse heat from the recording layer and the light absorption layer.

In view of the foregoing, it is a first object of the present invention to increase the ratio (Ac/Aa) of light absorption rate in the crystalline state relative to the amorphous state without deteriorating each of the characteristics in recording, erasing and reading in a phase-change optical recording medium having a light recording layer comprising a Ge—Te—Sb alloy. Further, it is a second object of the present invention to enable to precisely conduct mark edge recording at high recording density in a phase-change optical recording medium having light absorption layer just above/or just beneath the recording layer.

DISCLOSURE OF THE INVENTION

The present inventors have made earnest studies in order to solve the foregoing subject, as a result, have found a new design concept for attaining a high ratio (Ac/Aa) of light absorption rate, and have accomplished the present invention on the basis of the above finding.

The present invention provides a method of designing a phase-change recording medium having a recording layer comprising an alloy comprising at least Ge, Sb, Te in which phase change occurs reversibly between a crystalline state and an amorphous state in accordance with the intensity of an irradiated laser beam, and a substrate for supporting the recording layer, and conducting recording, erasing and reading of information by irradiation of laser beam wherein the intensity ratio of a reflection wave to an incident wave at the interface of the recording layer on the light incident side in a state where the recording layer is in a crystalline state and in an amorphous state, (Rra: in a case where the recording layer is in an amorphous state and Rrc: in a case where the recording layer is in a crystalline state), simultaneously satisfy the following equation (1), equation (2) and equation (3):

$$Rra - Rrc \geq -0.2 \tag{1}$$

$$Rra - 0.9 \times Rrc \leq 0.05 \tag{2}$$

$$Rra + Rrc \geq 0.18 \tag{3}$$

The designing method is based on a novel design concept for medium taking notice on the reflection phenomenon at the interface and the function thereof will be explained below.

The light absorption rate in a substance can be calculated based on a light absorption coefficient α determined by the following equation (14).

$$\alpha = 4\pi \times k/\lambda \tag{14}$$

where k is an extinction coefficient of a substance, and λ is a wavelength of a light (the foregoing are cited from Optical Physical Property Handbook (Asakura Shoten), page 7)).

By the way, the values for the extinction coefficient kc in the crystalline state and the extinction coefficient ka in the amorphous state at a wavelength of 680 nm in the material of the recording layer comprising the Ge—Te—Sb alloy are as follows.

$$kc = 4.33, Ka = 1.64 \tag{15}$$

Accordingly, in view of the equation (14), the light absorption rate Ac in the crystalline state must be higher than Aa in the amorphous state, but the result is contrary in the existent phase-change recording medium.

This cause will be explained below.

The reflectance (energy reflectance)R at the interface at which different two layers are in adjacent with each other can be calculated by using the following equation (16).

$$R = \frac{(n_1 - n_2)^2 + k_2^2}{(n_1 + n_2)^2 + k_2^2} \times 100 \tag{16}$$

where $n_1$ is a refractive index of a transparent medium "1" on the laser beam incident side, $n_2$ is a refractive index of a medium "2" as a layer adjacent with the medium "1", and $k_2$ is an extinction coefficient of the medium "121" (the foregoing are cited from "Applied Optics" (written by Masao Tsuruta, published from Baifukann, (p 44)).

Using the equation (16) above and calculating a reflectance of a laser beam incident from the protection layer and reflected on an interface between a protection layer (ZnS-SiO$_2$, $n_1$=2.12, $k_1$=0.0) and a recording layer (Ge—Te—Sb alloy, $n_2$=4.3, $k_2$=1.64 in an amorphous state and $n_2$=4.4, $k_2$=4.33 in a crystalline state), used in the existent phase-change optical recording medium, the reflectance Ra when the recording layer is in the amorphous state is 16.9% and the reflectance Rc when the recording layer is in the crystalline state is 39.1%.

As described above, in the existent phase-change recording medium, the light absorption rate Aa in the amorphous state is made higher than the light absorption rate Ac in the crystalline state due to the relation of the reflectance (Ra<Rc) between the amorphous state and the crystalline state at the interface of the recording layer on the beam incident side. Namely, while the beam incident to the interface of the recording layer is reflected at the interface, since the reflectance thereof is higher in the crystalline state, the amount of laser beam incident upon and absorbed in the recording layer in the crystalline state is reduced more as compared with that in the amorphous state. As a result, it can be concluded that the relation for the amount of the light absorbed between the amorphous state and the crystalline state is made contrary to the relation considered from the equation (14).

In the designing method according to the present invention, it is possible to improve the reflection phenomenon at the interface and attain high Ac/Aa, and increase the optical contrast (difference ΔR: with respect to the medium reflectance in which the recording layer is in the crystalline state and the medium reflectance in which the recording layer is in the amorphous state), such that the interface reflection intensity ratio in which the recording layer is in the crystalline state (intensity ratio of the reflection wave to the incident wave at the interface of the recording layer on the laser beam incident side) Rrc and the interface reflection intensity ratio Rra in which the recording layer is in the amorphous state simultaneously satisfy the equation (1), the equation (2) and the equation (3).

Further, as a concrete example of the designing method according to the present invention, it can be mentioned that an interface reflection control layer is disposed at the interface of the recording layer on the laser beam incident side and the refractive index n and the extinction coefficient k are adapted to simultaneously satisfy the following equation (4), equation (5) and equation (6).

$$k \geq 0.22n + 0.14 \tag{4}$$

$$k \leq 0.88n - 0.19 \tag{5}$$

$$n \leq = 2.8 \tag{6}$$

The present invention further provides a phase-change optical recording medium obtained by the designing method, namely, a phase-change recording medium having a recording layer comprising an alloy at least containing Ge, Sb, Te in which reversible phase change occurs between a crystalline state and an amorphous state in accordance with the intensity of an irradiated laser beam and a substrate for supporting the recording layer, and conducting recording, erasing and reading of information by irradiation of laser beam, wherein an interface reflection control layer constituted with a material having a reflectance n and an extinction coefficient k simultaneously satisfying the equation (4), the equation (5), and the equation (6) is disposed at the interface of the recording layer on the laser beam incident side.

Further, as another concrete example of the designing method according to the present invention, it can be mentioned to dispose interface reflection control layers just beneath and just above the recording layer, such that a refractive index $ni_1$ and an extinction coefficient $ki_1$ of a first interface reflection control layer disposed to the recording layer on the laser beam incident side simultaneously satisfy the following equation (7), equation (8) and equation (9), and such that a refractive index $ni_2$ and an extinction coefficient $ki_2$ of a second interface reflection control layer disposed to the recording layer on the side opposite to the laser beam incident side simultaneously satisfy the following equation (10), equation (11) and equation (12).

$$Ki_1 \geq 0.15 ni_1 \quad (7)$$

$$Ki_1 \leq 0.6 ni_1 \quad (8)$$

$$Ni_1 \leq 3.0 \quad (9)$$

$$Ki_2 \geq 0.35 \quad (10)$$

$$Ki_2 \leq 1.06 ni_2 + 0.25 \quad (11)$$

$$Ki_2 \geq ni_2 - 3.8 \quad (12)$$

Further, the present invention also provides a phase-change optical recording medium obtained by the designing method, namely, a phase-change recording medium having a recording layer comprising an alloy comprising at least Ge, Sb, Te in which reversible phase change occurs between a crystalline state and an amorphous state in accordance with the intensity of an irradiated laser beam and a substrate for supporting the recording layer, and conducting recording, erasing and reading of information by irradiation of laser beam, wherein interface reflection control layers are disposed just beneath and just above the recording layer, a first interface reflection control layer disposed to the recording layer on the laser beam incident side is constituted with a material having a refractive index $ni_1$ and an extinction coefficient $Ki_1$ simultaneously satisfying the equation (7) the equation (8) and the equation (9) above, and a second interface reflection control layer disposed to the recording layer on the side opposite to the beam incident side is constituted with a material having a refractive index $ni_2$ and an extinction coefficient $ki_2$ simultaneously satisfying the equation (10), the equation (11) and equation (12).

In the phase-change optical recording medium, it is possible to improve the phenomenon of the interface reflection described above thereby attaining a high ratio (Ac/Aa) of light absorption rate and increase the optical contrast, on the basis of the designing method according to the present invention, by disposing the interface reflection control layers just beneath and just above the recording layer and specifying the refractive index and the extinction coefficient of each of the interface reflection control layers.

In addition, disposition of the two interface reflection control layers enables to make the extinction coefficient $ki_1$ of the first interface reflection control layer smaller within a range of simultaneously satisfying the above-mentioned equation (7), equation (8) and equation (9), thereby reducing the amount of light absorption in the first interface reflection control layer and suppressing the amount of heat generation in the layer. Further, a higher ratio (Ac/Aa) of light absorption rate can be obtained, at the same time, a material having higher refractive index can be used for the first interface reflection control layer.

(FOR INTERFACE REFLECTION CONTROL LAYER)

The interface reflection control layer described above is preferably constituted with at least one selected from the group consisting of oxides, sulfides, nitrides, carbides and fluorides of metals, semimetals or semiconductors, which is a non-stoichiometric compound deficient in oxygenn, sulfur, nitrogen, carbon and fluorine. It is, particularly, preferred to be constituted with a non-stoichiometric compound deficient in sulfur in zinc sulfide, a non-stoichiometric compound deficient in nitrogen in aluminum nitride or a non-stoichiometric compound deficient in carbon in silicon carbide.

The non-stoichiometirc compound means a compound which is not in accordance with the law of definite proportion. For example, in a case of silicon oxide, $SiO_x$ (0<x<2) is used as a compound constituting the interface reflection control layer although the composition in accordance with the law of constant proportion is $SiO_2$. In the same manner, in a case of zinc sulfide, $Zn_{(1-x)}S_x$ (0<x<0.5) is used instead of ZnS. This is similar in the cases of nitride, carbide and fluoride.

When the interface reflection control layer is constituted with such a non-stoichiometric compound, since the diffusion of the material of the recording layer into the interface reflection control layer in the course of melting the material of the recording layer is prevented during recording, change of characteristic due to repetitive recording is less caused. Further, since such a non-stoichiometric compound has a light absorbing property, optical constants (refractive index n and extinction coefficient k) satisfying each of the equations described above, which are required as the interface reflection control layer, can be obtained.

Particularly, since zinc sulfide, aluminum nitride and silicon carbide have good adhesion with the material of the recording layer and wettability on melting the recording layer, the phase-change optical recording medium using them as a material for the interface reflection control layer has particularly increased cyclability of recording and erasing.

When the interface reflection control layer is made of a non-stoichiometric compound deficient in sulfur in zinc sulfide, it is preferred that x in $Zn_{(1-x)}X_x$ is within a range; $0.2 \leq x < 0.5$ and, particularly, it is $0.3 \leq x < 0.5$ with a view point of cyclability.

The interface reflection control layer comprising the non-stoichiometric compound as described above can be manufactured by the following method. Explanation is to be made hereinafter to a sputtering method, as an example of the thin film forming method which is most common with an industrial point of view.

As a first method, there is a method of preparing a target comprising a metal, semimetal or semiconductor as a constituent element of a non-stoichiometric compound, using a gas mixture of a rare gas such as argon and a reactive gas such as oxygenn, sulfur sulfide, nitrogen or methane and carrying out reactive sputtering.

According to this method, in a case of an aluminum nitride film for instance, a film of $Al_{(1-x)}N_x$ can be formed by using an Al target and sputtering using a gas mixture of argon and nitrogen. Particularly, in this method, a film of a composition within a range: $0 \leq x \leq 0.5$ (Al film at x=0, AlN film at x=0.5) can be manufactured optionally by varying the mixing ratio of the nitrogen gas into the argon gas.

As the second method, there is a method of preparing a target comprising a compound having a composition in accordance with the law of definite proportion of a compound intended to be formed, and conducting reactive sputtering by using only the rare gas such as argon or a gas mixture of a rare gas used for sputtering and a reactive gas such as oxygenn, hydrogen sulfide, nitrogen or methane.

According to this method, in a case of aluminum nitride, for instance, it is possible to obtain a film usually deficient in nitrogen by conducting ordinary sputtering for an AlN target by using only the argon gas. If the amount of nitrogen deficient in the resultant film is excessively larger than a desired value, a desired film of $Al_{(1-x)}N_x$ can be formed by sputtering using a gas mixture of argon and nitrogen.

As a third method, there is a method of preparing a target comprising a mixture of a compound having a composition in accordance with the law of definite proportion and a metal, semimetal or semiconductor as a constituent element of the compound and sputtering. For instance, in a case of zinc sulfide, when sputtering is applied by using a target comprising ZnS, a sulfur-excessive film can usually be obtained. On the other hand, a sulfur-deficient zinc sulfide film is obtained by using a target formed by mixing ZnS and Zn at an appropriate mixing ratio, followed by solidification and sputtering using an argon gas. Also in this case, a gas mixture comprising a rare gas and a reactive gas can be used at need as an atmospheric gas for sputtering.

The composition of the film obtained can be measured as described below. Explanation is to be made herein to a case of ZnS as an example.

Namely, the obtained film is subjected to a fluorescence x-ray measuring apparatus to measure the existing ratio of sulfur atoms: $Y=(S/(Zn+S))$ under a predetermined condition. The existing ratio of sulfur atoms $(S/(Zn+S))$ is measured under the same condition also for ZnS, which is defined as a standard value $Y_o$. X in $Zn_{(1-x)}X_x$ is calculated based on the thus determined Y and $Y_0$ in accordance with the following equation (13)

$$x=0.5Y/Y_0 \quad (13)$$

The interface reflection control layer is not limited to those constituted with such non-stoichiometric compounds but any material may suffice providing that the material simultaneously satisfies equations (4)–(6) (when formed only to the interface of the recording layer on the laser beam incident side) or simultaneously satisfies the equations (7)–(12) (when formed both just beneath and just above the recording layer).

Namely, the interface reflection control layer may be either a carbon film or a mixed film comprising at least one compound selected from the group consisting of sulfide, nitride, carbide and fluoride and an element having a high melting point. As the element having high melting point, it is preferred to use an element selected from the group consisting of W, Mo, Cr, Ta, Nb, Hf, Zr, Ti, Co, Pt, Pd, Ni, Au, Ag, Cu, C, Al, Si and Ge.

When the interface reflection control layer consists of carbonn, the condition described above (optical characteristic) as the interface reflection control layer can be satisfied with a single material and the wettability upon melting the recording layer is satisfactory.

When the interface reflection control layer is a mixed film as described above, since both of the materials constituting the mixed film less diffuse the material of the recording layer in the course of melting the material of the recording layer during recording, change of characteristic due to repetitive recording less occurs.

Generally, since the oxide, sulfide, nitride, carbide and fluoride of metal, semimetal or semiconductor is highly transparent and the element having high melting point has high light absorbability, the optical constants satisfying each of the foregoing equations (refractive index n and extinction coefficient k) required as the interface reflection control layer of the present invention can be obtained by selecting the content of the element having high melting point.

When the interface reflection control layer is the mixed film as described above, it is particularly preferred to use, as the compound for constituting the mixed film, a mixture of any of an oxide, nitride, carbide and fluoride of a metal, semimetal or semiconductor, and zinc sulfide. Since this increases adhesion with the recording layer, and wettability upon melting the recording layer is good, cyclability of recording and erasing can be increased.

The thickness of the interface reflection control layer is preferably from 5 nm to 100 nm. If it is less than 5 nm, it is difficult to form a uniform continuous film. If it exceeds 100 nm, the amount of light absorption in the interface reflection control layer itself becomes excessive to lower the recording sensitivity or decrease the optical contrast.

In the phase-change optical recording medium according to the present invention, a protection layer comprising a dielectric material is preferably disposed between an interface reflection control layer disposed in adjacent with the interface of the recording layer on the side of the laser beam incident side and a substrate.

Namely, if the interface reflection control layer to be disposed just beneath the recording layer is disposed directly on the substrate, it is considered that the substrate may be deformed due to the effect of heat generated being accompanied by the light absorption in the recording layer and the interface reflection control layer. On the contrary, when a protection layer comprising a dielectric material of low thermal conductivity and heat diffusibility is disposed between the interface reflection control layer and the substrate, since the protection layer functions as a heat insulation layer, it is possible to reliably prevent deformation of the substrate as described above and improve the erasing characteristic and cyclability.

(FOR HEAT DIFFUSION LAYER)

Further, in the phase-change optical recording medium according to the present invention, it is also preferred to dispose, between the interface reflection control layer disposed in adjacent with the interface of the recording layer on the laser beam incident side (light absorption layer having a refractive index and an extinction coefficient satisfying the conditions described above) and a substrate, a heat diffusion layer comprising aluminum nitride, boron nitride, silicon nitride, titanium nitride, carbonn, silicon carbide, titanium carbide, tantalum carbide, tungsten carbide, aluminum oxide, magnesium oxide, zirconium borides, $MoSi_2$, metal, semimetal or semiconductor. Examples of the metal, semimetal and semiconductor used herein can include, for example, Au, Ag, Cu, Al, Pd, Ni, Co, Pt, Ti, Ta, Nb, V, Cr, Mo, W, Si, and Ge.

When such a heat diffusion layer is disposed, heat generated in the recording layer is efficiently diffused to the heat diffusion layer.

FIG. 1 schematically illustrates a flow of heat in a phase-change optical recording medium according to the present invention taking, as an example, a layer structure corresponding to one embodiment of a phase-change optical recording medium according to the present invention.

A portion of heat generated in a recording layer 4 is conducted through an upper protection layer 5 to a reflection layer 6 but, in addition, a portion of heat is conducted also through an interface reflection control layer 3 and a lower protection layer 2 to a heat diffusion layer 7. Then, since the heat diffusion layer 7 and the reflection layer 6 have high thermal conductivity, most of the heat generated in the recording layer 4 is conducted and diffused to these layers and, as a result, heat prevailing in the plane of the recording layer 4 is reduced. Further, since the heat generated being accompanied by the light absorption in the interface reflection control layer is also conducted and diffused to the heat diffusion layer 7, a cooling rate necessary for quenching upon amorphous formation can be obtained.

On the contrary, in a phase-change optical recording medium of an existent layer structure as shown in FIG. 2, a portion for dissipating heat generated in the recording layer 4 is only the reflection layer 6 and the amount of heat dissipated can be increased somewhat by selecting the material constituting the reflection layer 6, selecting the thickness of the reflection layer 6 and selecting the thickness of the protection layers 2 and 5, but no sufficient effect can be obtained.

As described above, since the extension of the temperature distribution within the film plane of the recording layer is suppressed by disposing the heat diffusion layer, not only a small recording mark can be formed but also the effect of heat generated upon forming the just preceding mark on the succeeding mark formation can be reduced, so that distance between the recording marks can be reduced. Further, a temperature distribution from the starting position to the end position of the mark formation can be unified to also decrease the distortion of shape of the mark.

Further, since heat generated in the recording layer is efficiently dissipated in the heat diffusion layer, deformation or distortion due to thermal expansion or thermal shrinkage of the protection layer or the recording layer and the interface reflection control layer, as well as the protection layer and the reflection layer can be reduced to improve the cyclability for overwriting.

Meanwhile, when a heat diffusion layer is disposed just beneath the interface reflection control layer just below the recording layer, since heat generated in a portion of the recording layer irradiated with a recording beam is instantly dissipated into the heat diffusion layer, temperature elevation in the recording layer may sometimes be suppressed excessively to require a large energy for recording.

On the contrary, when a protection layer comprising a dielectric material is disposed between the heat diffusion layer and the interface reflection control layer just beneath the recording layer, it is possible to control the transfer rate of dissipating the heat generated in the recording layer into the heat diffusion layer by selecting the material and the thickness of the protection layer. By such control of thermal characteristics, it is possible to obtain a recording sensitivity, temperature distribution and the like in accordance with the working conditions to make the recording sensitivity and cyclability compatible.

(FOR OTHER LAYER CONSTITUTION)

In actual practice of the present invention, various embodiments can be adopted as described below.

At first, when the interface reflection control layer is disposed only to the interface of the recording layer on the laser beam incident side (just beneath the recording layer), it is preferred to dispose a protection layer comprising a dielectric layer just above the recording layer and dispose a reflection layer comprising a metal material or a semiconductor material further thereover. This can ensure both of high optical contrast and high cyclability.

The protection layer in this case is preferably constituted with a mixture of a sulfide of a metal or a semimetal and an oxide, nitride, carbide or fluoride of a metal or a semimetal, constitution with a mixture of zinc sulfide and a silicon oxide being particularly preferred.

Secondly, when an interface reflection control layers are disposed both just above and just beneath the recording layer, it is preferred to dispose a reflection layer comprising a metal material or a semiconductor material on an interface reflection control layer disposed just above the recording layer. From the foregoing, a high optical contrast can be ensured. Further, in this case, a high cyclability can be ensured by disposing a protection layer comprising a dielectric material between the interface reflection control layer disposed just above the recording layer and the reflection layer.

As the material for constituting the reflection layer, use of an alloy comprising Al as a main component, an alloy comprising a single element of W and Mo, at least one kind selected from group A (Ge, Si) and at least one kind selected from group B (Al, Au, Ag, Ti, V), or an alloy comprising at least one kind selected from group C (W, Mo) and at least one kind of element selected from group D (V, Nb, Ti) is preferred since higher ratio (Ac/Aa) of light absorption rate can be obtained.

As described above, when the reflection layer is disposed on the recording layer, since light transmitting the recording layer is reflected on the reflection layer and a reflection light interferes with an incident laser beam to each other, it is possible to obtain a high optical contrast even if the thickness of the recording layer is reduced. Then, if the thickness of the recording layer can be reduced, satisfactory characteristics can be obtained in view of recording characteristics, cyclability and increased density by the effects shown below.

① Since the thermal capacity is reduced, energy required for heating can be reduced, so that recording density is increased. Further, since the cooling rate can be made higher, amorphous recording mark can be formed easily.

② Since the temperature distribution in the direction of the film thickness and within the film plane is made flat and segregation or phase separation of the material of the recording layer is suppressed, cyclability can be improved.

③ Since conduction of heat generated in the recording layer within a plane of the film is suppressed, it is possible to reduce the size of the recording mark. Further, since it is possible to make the spaced marks to bring closer to each other, it is advantageous in view of high density recording.

However, if the reflection layer is disposed just above the recording layer, it may be considered that the material of the reflection layer diffuses into the recording layer or the material of the recording layer diffuses into the reflection layer during recording to change the recording and erasing characteristics by repetitive recording, but such a phenomenon can be avoided by interposing a protection layer comprising a dielectric material between the recording layer and the reflection layer.

Further, with such a structure, it is possible to control the conduction rate of diffusing the heat generated in the recording layer into the reflection layer by selecting the material and the film thickness of the protection layer. With such control for the thermal characteristics, it is possible to obtain a recording sensitivity, temperature distribution and the like in accordance with the working conditions.

In a case of disposing an interface reflection control layer also just above the recording layer (second interface reflection control layer), it is also possible to provide the interface reflection control layer with the function of the protection layer. Further, a reflection layer may be disposed on the second interface reflection control layer through a protection layer comprising a dielectric material thereby causing the second interface reflection control layer to exclusively take place an optical effect, while causing the protection layer to conduct control of the thermal characteristic described above.

BEST MODE FOR PRACTICING THE INVENTION

An embodiment of the present invention will hereinafter be explained concretely with reference to the drawings.

Figure 3:
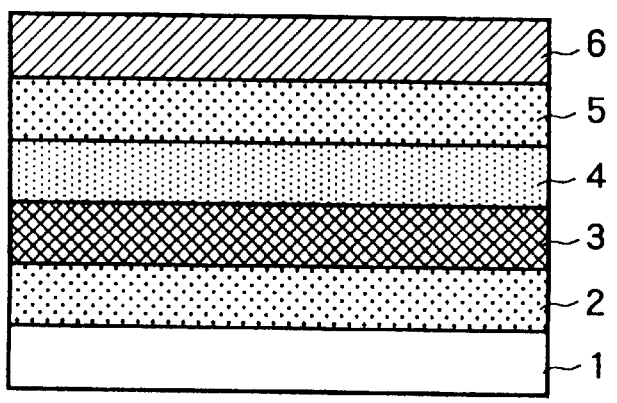
FIG. 3 is a schematic cross sectional view illustrating an embodiment of a phase-change recording medium according to the present invention.

FIG. 3 is a schematic cross sectional view illustrating one embodiment of a phase-change recording medium according to the present invention, in which each of a first protection layer 2, an interface reflection control layer 3, a recording layer 4 comprising an alloy comprising at least Ge, Sb, Te, a second protection layer 5 and a reflection layer 6 is deposited in this order on a substrate 1.

The thickness for each of the layers is optimized so as to satisfy various characteristics of the recording medium such as optical contrast ΔR of a recording medium (difference between a medium reflectance when the recording layer is in a crystalline state and a medium reflectance when a recording layer is in an amorphous state), a ratio (Ac/Aa) of light absorption rate and cyclability. For example, since the reflectance of the recording medium can be changed periodically by changing the thickness of the first protection layer 2, the thickness of the first protection layer 2 is made to such a thickness as to be advantageous to ΔR and Ac/Aa.

Further, the interface reflection control layer 3 can exhibit its effect at a thickness of about 5 nm to about 10 nm that can be present as a continuous film and it is defined to about 100 nm in a case where the strength of the film itself is necessary. The thickness of the recording layer 4 is preferably from 10 nm to 50 nm and, out of the range, it is difficult to make the cyclability and high Ac/Aa compatible to each other. The thickness of the second protection layer 5 is preferably 50 nm or less that can provide an advantageous cooling condition for cyclability and, in the same manner, the thickness of the reflection layer 6 is preferably 50 nm or more that can increase the cooling rate.

Figure 4:
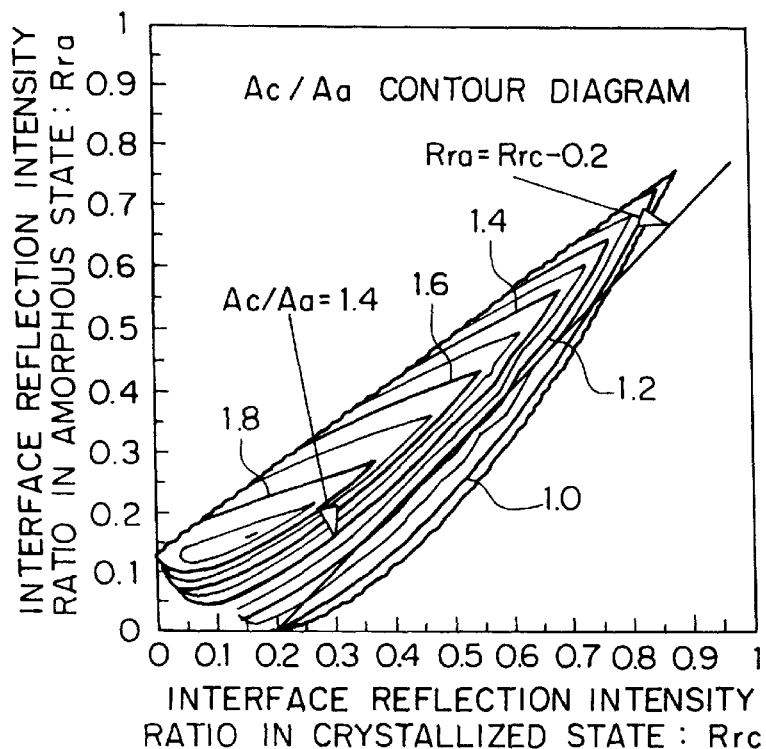
FIG. 4 is a graph showing a contour for a ratio (Ac/Aa) of light absorption rate in a correlationship between an interface reflection intensity ratio Rra in an amorphous state and an interface reflection intensity ratio Rrc in a crystalline state of a recording layer.

Multi-layered film was optically designed by setting the optical constant and the film thickness for each of the layers as shown in Table 1 (while varying the refractive index n and the extinction coefficient k for the interface reflection control layer 3), and a contour for a ratio (Ac/Aa) of light absorption rate and a contour for an optical contrast ΔR in a correlationship between an interface reflection intensity ratio in an amorphous state of the recording layer 4 (intensity ratio of a reflection wave relative to an incident wave from the side of the interface reflection control layer 3 at the interface of the recording layer 4 with the interface reflection control layer 3) Rra and an interface reflection intensity ratio Rrc in a crystalline state of the recording layer 4 were prepared. FIG. 4 is a graph showing a contour for the ratio (Ac/Aa) of light absorption rate and FIG. 5 is a graph showing a contour for the optical contrast ΔR.

As can be seen from FIG. 4, the ratio (Ac/Aa) of light absorption rate can be increased to 1.2 or higher by designing such that Rra and Rrc satisfy the equation (1) in the present invention (that is, Rra−Rrc≦0.2).

Figure 5:
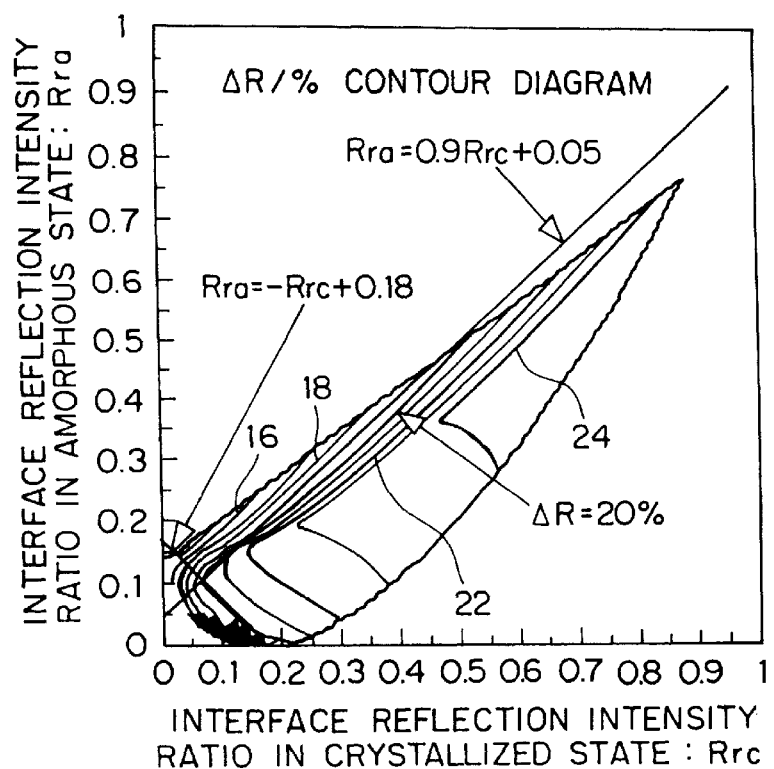
FIG. 5 is a graph showing a contour for an optical contrast ΔR in a correlationship between an interface reflection intensity ratio Rra in an amorphous state and an interface reflection intensity ratio Rrc in a crystalline state of a recording layer.

Further, as can be seen from FIG. 5, a sufficient optical contrast ΔR of 20% or more can be obtained by designing such that Rra and Rrc satisfy the equation (2) and the equation (3) in the present invention (that is, Rra−0.9× Rrc≦0.05, and Rra+Rrc≧0.18). The optical contrast can no more be obtained, out of the range of the equation (2) and an average reflectance of the recording medium is lowered out of the range of the equation (3), failing to obtain a sufficient signal intensity, which is not preferred.

Figure 6:
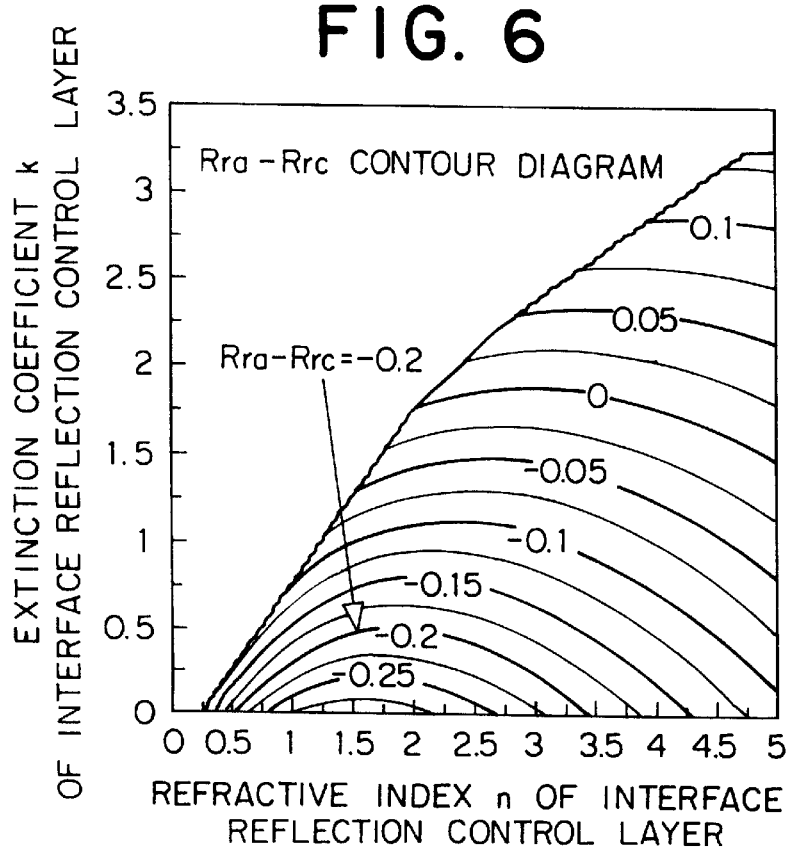
FIG. 6 is a graph showing a contour for (Rra−Rrc) in a correlationship between an extinction coefficient k and a refractive index n of an interface reflection control layer.
Figure 7:
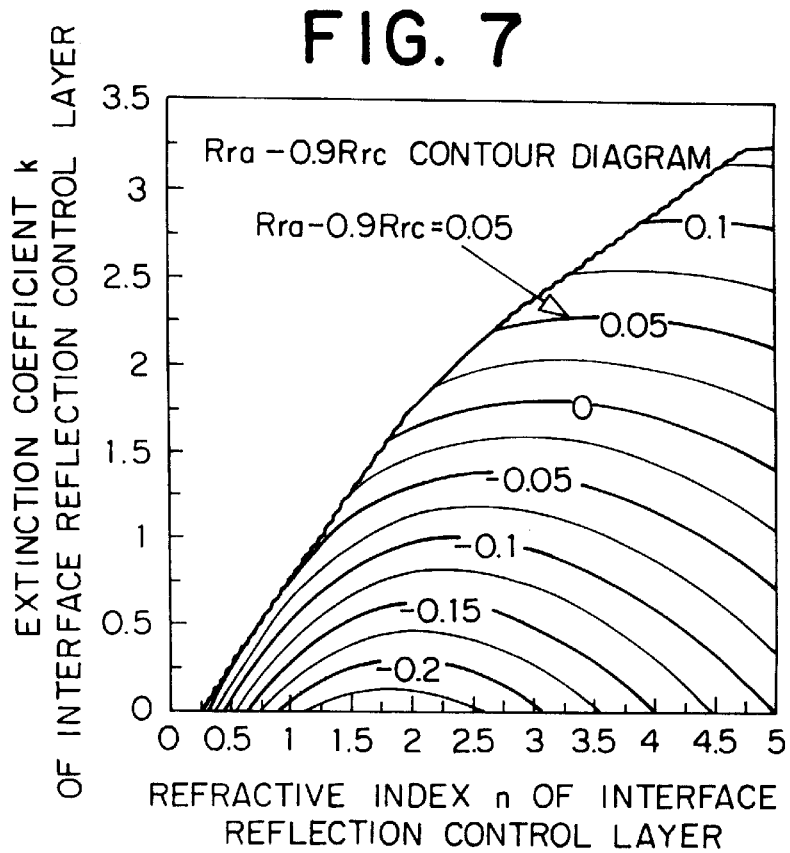
FIG. 7 is a graph showing a contour for (Rra−0.9 Rrc) in a correlationship between an extinction coefficient k and a refractive index n of an interface reflection control layer.
Figure 8:
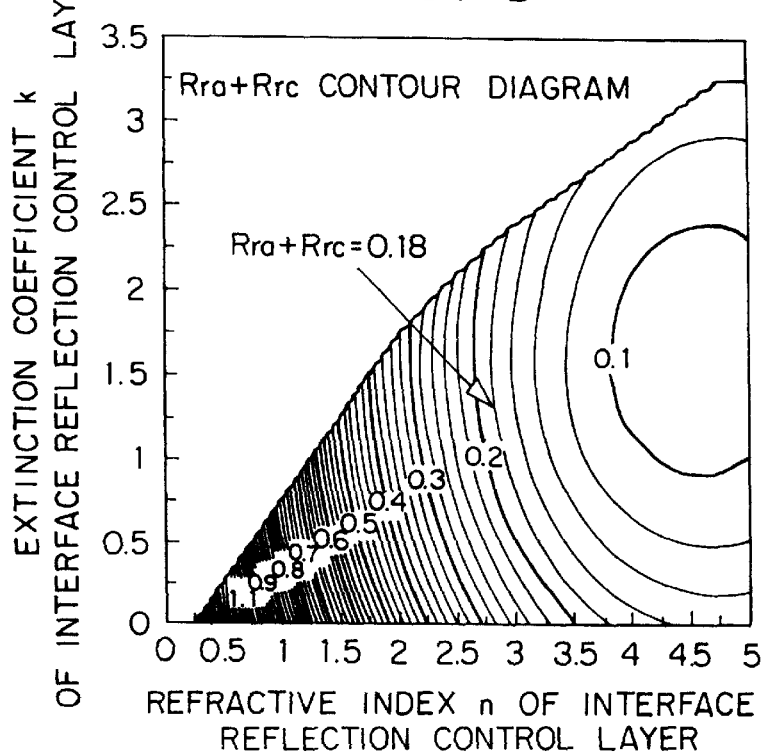
FIG. 8 is a graph showing a contour for (Rra+Rrc) in a correlationship between an extinction coefficient k and a refractive index n of an interface reflection control layer.
Figure 9:
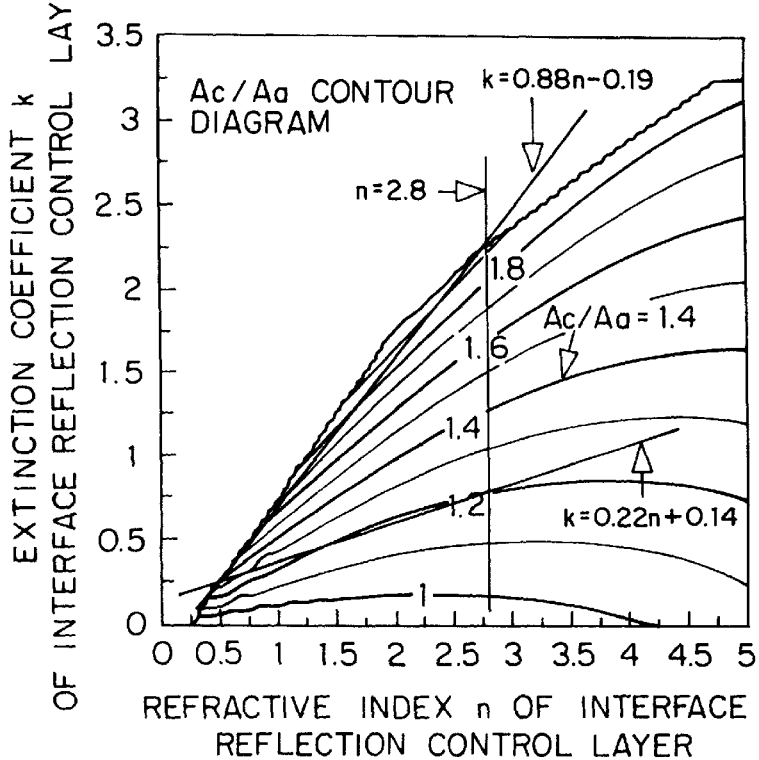
FIG. 9 is a graph showing a contour for a ratio (Ac/Aa) of light absorption factor in a correlationship between an extinction coefficient k and a refractive index n of an interface reflection control layer.

FIG. 6 is a graph showing a contour for (Rra−Rrc) in a correlationship between an extinction coefficient k and a refractive index n of the interface reflection control layer 3 in a design based on Table 1, FIG. 7 is a graph also showing a contour for (Rra−0.9Rrc) and, FIG. 8 is a graph also showing a contour for (Rra+Rrc). FIG. 9 is a graph showing a contour for a ratio (Ac/Aa) of light absorption rate in a correlationship between an extinction coefficient k and a refractive index n of an interface reflection control layer 3 and FIG. 10 is a graph also showing a contour for the optical contrast ΔR.

Figure 10:
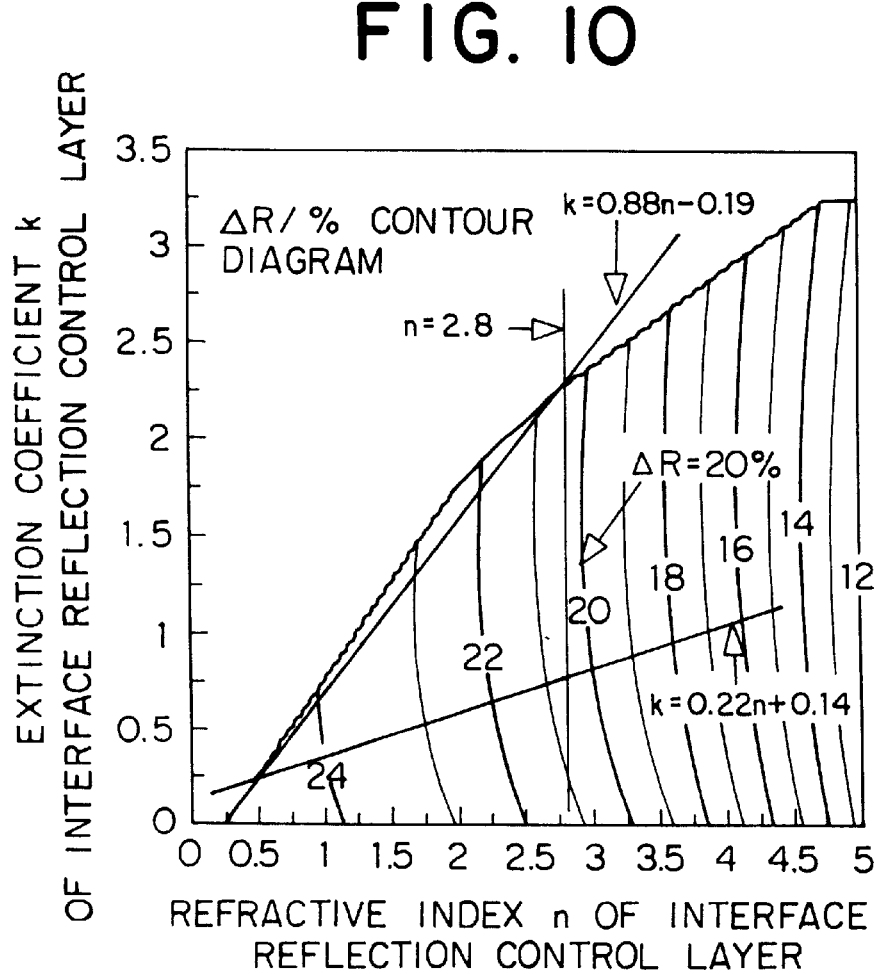
FIG. 10 is a graph showing a contour for optical contrast ΔR in a correlationship between an extinction coefficient k and a refractive index n of an interface reflection control layer.

As can be seen from FIG. 9 and FIG. 10, the ratio (Ac/Aa) of light absorption rate can be increased to 1.2 or higher and a sufficient optical contrast ΔR of 20% or more can be obtained by designing such that an extinction coefficient k and a refractive index n of the interface reflection control layer 3 can simultaneously satisfy the equations (4)–(6) in the present invention (that is, k≦0.22Xn+0.14, and k≦0.88Xn−0.19, and n≦2.8).

Figure 11:
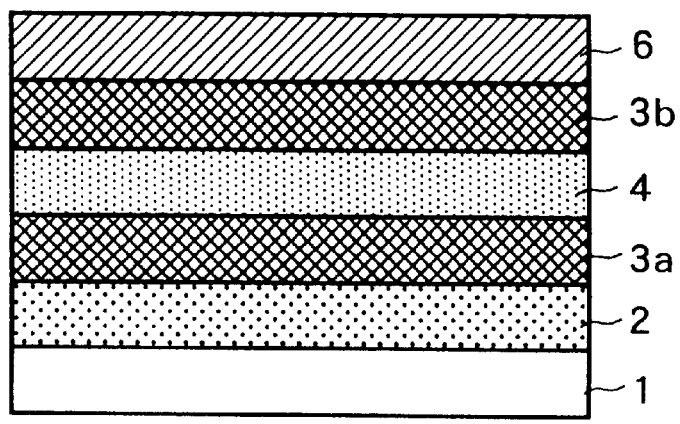
FIG. 11 is a schematic cross sectional view illustrating an embodiment of a phase-change recording medium according to the present invention.

FIG. 11 is a schematic cross sectional view illustrating another embodiment of a phase-change recording medium according to the present invention, in which each of a protection layer 2, a first interface reflection control layer 3*a*, a recording layer 4 comprising an alloy comprising at least Ge, Sb, Te, a second interface control layer 3*b* and a reflection layer 6 is deposited in this order on a substrate 1.

The thickness for each of the layers is optimized so as to satisfy various characteristics such as optical contrast ΔR, ratio (Ac/Aa) of light absorption rate and cyclability of a recording medium. For example, since the reflectance of the recording medium can be changed periodically by changing the thickness of the protection layer 2, the thickness of the first protection layer 2 is determined to such a thickness as to be advantageous to ΔR and Ac/Aa.

Further, the interface reflection control layer 3 can exhibit its effect at a thickness of about 5 nm to about 10 nm that can be present as a continuous film and it is defined to about 100 nm in a case where the strength of the film itself is necessary. The thickness of the recording layer 4 is preferably from 10 nm to 50 nm and, out of the range, it is difficult to make the cyclability and high Ac/Aa compatible to each other. The second interface reflection control layer 3*b* can exhibit its effect at a thickness of about 5 nm to about 10 nm that can be present as a continuous film in the same manner as in the first interface reflection control layer 3*a*, and the thickness is selected in accordance with required thermal characteristics. The thickness of the reflection layer 6 is preferably 50 nm or more that can increase the cooling rate.

Figure 12:
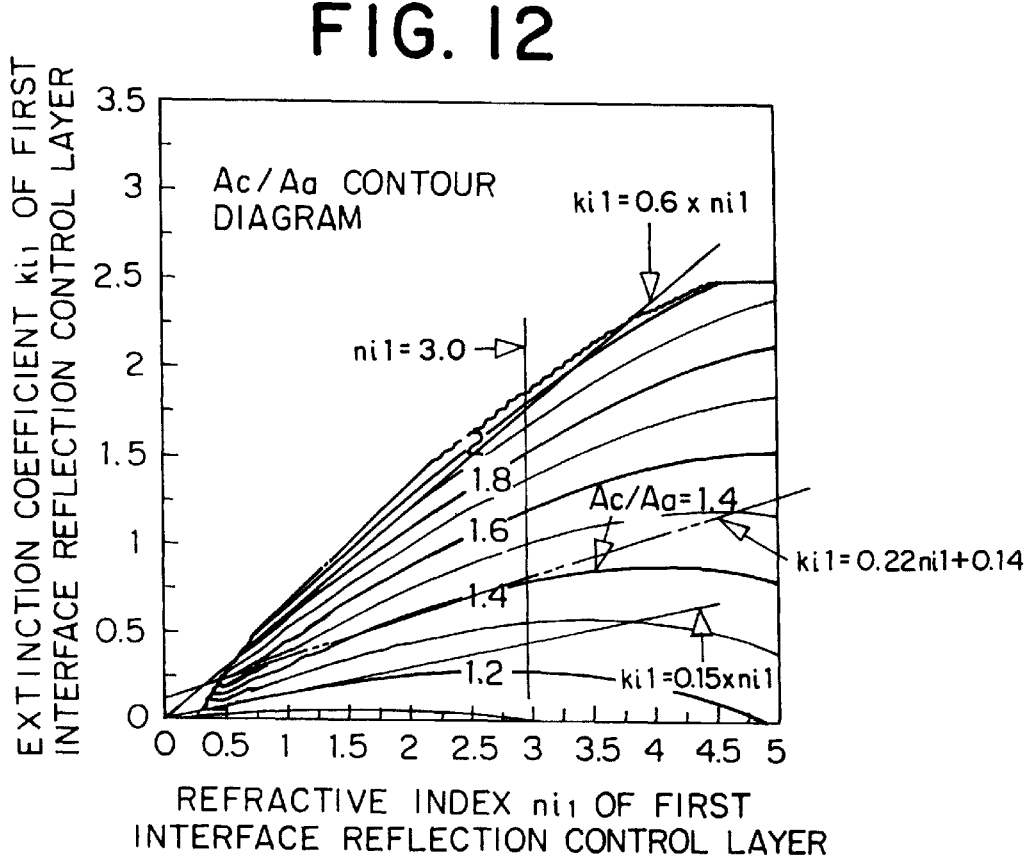
FIG. 12 is a graph showing a contour for a ratio (Ac/Aa) of light absorption rate in a correlationship between an extinction coefficient $ki_1$ and a refractive index $ni_1$ of a first interface reflection control layer.

Multi-layered film was optically designed by setting the optical constant and the film thickness for each of the layers as shown in Table 2 (while varying the refractive index and the extinction coefficient of the first interface reflection control layer 3*a*), and a contour for a ratio (Ac/Aa) of light absorption rate and a contour for an optical contrast ΔR in a correlationship between the extinction coefficient $ki_1$ and the refractive index $ni_1$ of the first interface reflection control layer 3*a* were prepared. FIG. 12 is a graph showing a contour for a ratio (Ac/Aa) of light absorption rate and FIG. 13 is a graph showing a contour for an optical contrast ΔR.

Figure 13:
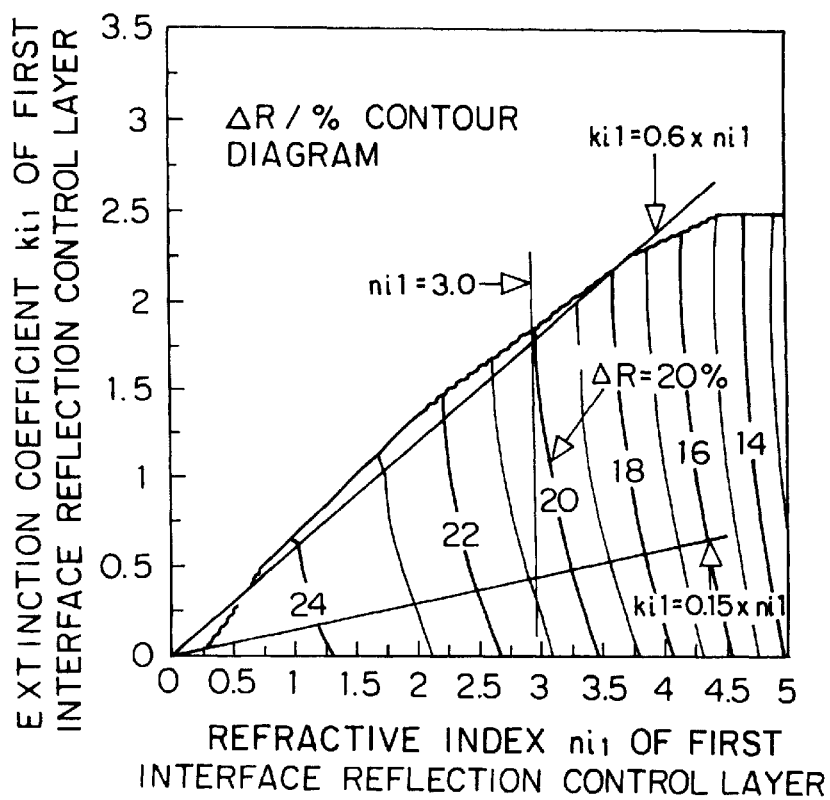
FIG. 13 is a graph showing a contour for optical contrast ΔR in a correlationship between an extinction coefficient $ki_1$ and a refractive index $ni_1$ of a first interface reflection control layer.

As can be seen from FIG. 12 and FIG. 13, the ratio (Ac/Aa) of light absorption rate can be increased to 1.2 or higher and sufficient optical contrast ΔR of 20% or more can be obtained by designing such that the extinction coefficient $ki_1$ and the refractive index $ni_1$ of the first interface reflection control layer 3*a* simultaneously satisfy the equations (7)–(9) in the present invention (that is, $ki_1 \geq 0.15X\ ni_1$, $ki_1 \leq 0.6X\ ni_1$ and $ni_1 < 3.0$).

Further, it has been found experimentally that the change of characteristic due to repetitive recording can be reduced within a range of: $ki_1 \leq 0.22Xni_1 + 0.14$ giving Ac/Aa≧1.4 in FIG. 12. It is considered that because the amount of light absorption in the first interface reflection control layer 3*a* is reduced by lowering the extinction coefficient $ki_1$ of the layer, by which the amount of heat generation in the layer can be suppressed and the thermal load on the film can be suppressed.

Figure 14:
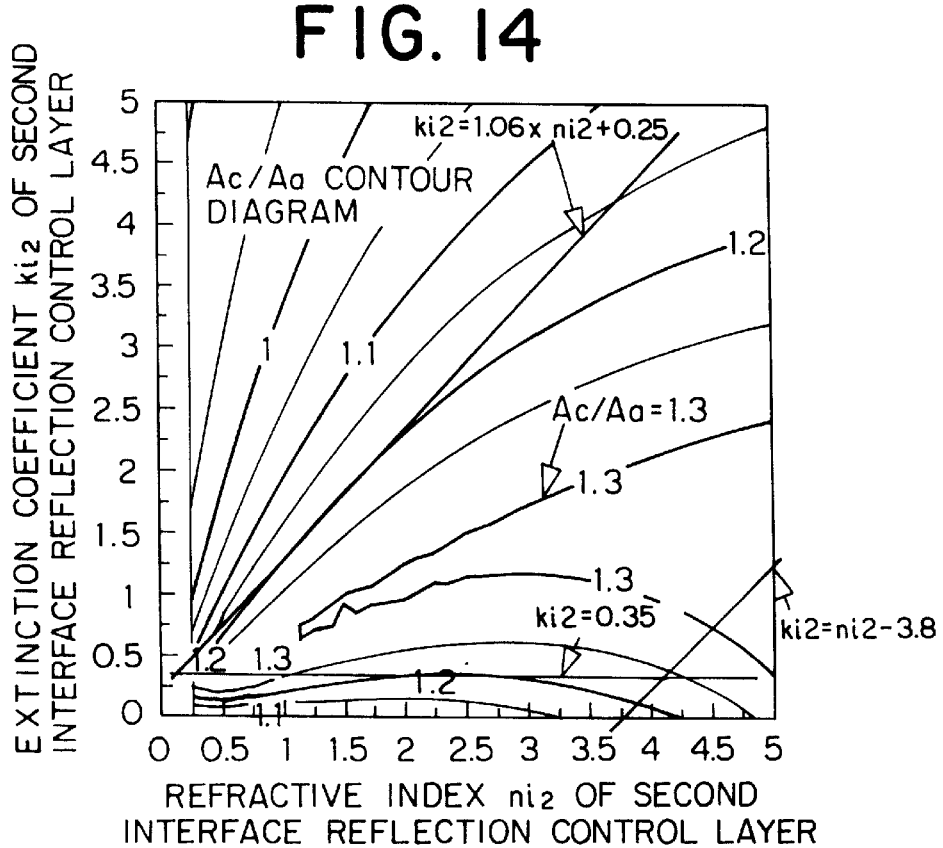
FIG. 14 is a graph showing a contour for a ratio (Ac/Aa) of light absorption rate in a correlationship between an extinction coefficient $ki_2$ and a refractive index $ni_2$ of a second interface reflection control layer.
Figure 15:
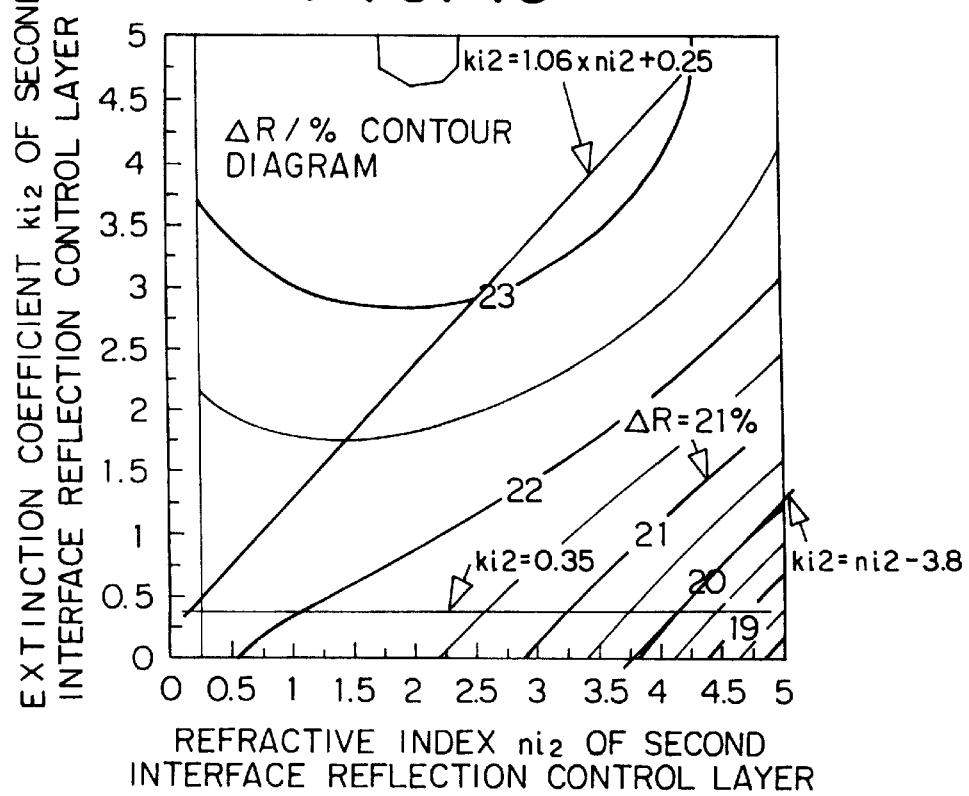
FIG. 15 is a graph showing a contour for an optical contrast ΔR in a correlationship between an extinction coefficient $ki_2$ and a refractive index $ni_2$ of a second interface reflection control layer.

Then, a multi-layered film was optically designed by setting the optical constant and the film thickness for each of the layers as shown in Table 3 (while varying the refractive index and the extinction coefficient of the second interface reflection control layer 3*b*), and a contour for a ratio (Ac/Aa) of light absorption rate and a contour for an optical contrast ΔR in the correlationship between the extinction coefficient $ki_2$ and the refractive index $ni_2$ of the second interface reflection control layer 3*b* were prepared, FIG. 14 is a graph showing a contour for the ratio (Ac/Aa) of light absorption rate and FIG. 15 is a graph showing a contour for the optical contrast ΔR.

As can be seen from FIG. 14 and FIG. 15, the ratio (Ac/Aa) of light absorption rate can be increased to 1.2 or higher and a sufficient optical contrast ΔR of 20% or more can be obtained by adapting such that the extinction coefficient $ki_2$ and the refractive index $ni_2$ of the second interface reflection control layer 3*b* simultaneously satisfy the equations (10)–(12) in the present invention (that is, $ki_2 \geq 0.35$, $ki_2 \leq 1.06Xni_2 + 0.25$ and $ki_2 \geq ni_2 - 3.8$).

Then, the reflectance at the interface of the recording layer 4 with the first interface reflection control layer 3*a* and the reflectance at the interface thereof with the second interface reflection control layer 3*b* are calculated for the cases in which the recording layer 4 is in the crystalline state and in the amorphous state respectively.

The reflectance (energy reflectance) at the interface at which two different layers are adjacent with each other, is represented, in a case where the medium on the laser beam incident side is not a transparent medium, not by the equation (16) but by the following equation (17) assuming the extinction coefficient of the medium (1) on the laser beam incident side as $k_1$:

$$R = \frac{(n_1 - n_2)^2 + (k_1 - k_2)^2}{(n_1 + n_2)^2 + (k_1 + k_2)^2} \times 100 \qquad (17)$$

Then, the reflectance Ra at the interface of the recording layer 4 in the amorphous state with the first interface reflection control layer 3*a* is 8.9% when calculated in accordance with the equation (17), in a case where refractive index $ni_1$ and the extinction coefficient $ki_1$ of the first interface reflection control layer 3*a* are set as $ni_1=2.5$ and $ki_1=0.5$ that simultaneously satisfy the equation (7), the equation (8) and the equation (9). In this case, the medium "1" is the first interface reflection control layer 3*a* while the medium "2" is a recording layer in the amorphous state.

In the same manner, the reflectance Rc at the interface of the recording layer 4 in the crystalline state with the first interface reflection control layer 3a is 25.8% when calculated in accordance with the equation (17). In this case, the medium "1" is the first interface reflection control layer 3a, while the medium "2" is the recording layer 4 in the crystalline state. Accordingly, the difference of the reflectance at the interface of the recording layer 4 with the first interface reflection control layer 3a (Rc−Ra=) is 16.9%, between the case in which the recording layer 4 is in the crystalline state and a case in which it is in the amorphous state, which is smaller than the value if the first interface reflection control layer 3a is not present (39.1−16.9=22.2%).

Further, the reflectance Ra at the interface of the recording layer 4 in the amorphous state with the second interface reflection control layer 3b is 5.3% when calculated in accordance with the equation (17), in a case where the refractive index $ni_2$ and the extinction coefficient $ki_2$ of the second interface reflection control layer 3b are set as $ni_2=2.7$ and $ki_2=1.0$ which simultaneously satisfy the equations (10), (11) and (12). In this case, the medium "1" is the recording layer 4 in the amorphous state, while the medium "2" is the second interface reflection control layer 3b.

In the same manner, the reflectance Rc at the interface of the recording layer 4 in the crystalline state with the second interface reflection control layer 3b is 17.7% when calculated in accordance with the equation (17). In this case, the medium "1" is the recording layer 4 in the crystallized state, while the medium "2" is the second interface reflection control layer 3b. Accordingly, the difference of the reflectance at the interface of the recording layer 4 with the second interface reflection control layer 3b between the cases where the recording layer 4 is in the crystalline state and it is in the amorphous state (Rc−Ra=) is smaller as 12.4%.

As described above, by restricting the refractive index and the extinction coefficient of each of the interface reflection control layers 3a and 3b within the range in the present invention, it is possible to decrease the difference (Rc−Ra) of the reflectance at the interface of the recording layer 4 with each of the control layers 3a and 3b between the cases in which the recording layer is in the crystalline state and it is in the amorphous state, to thereby increase the ratio (Ac/Aa) of light absorption rate in the recording layer 4.

Concrete examples are to be given below.

EXAMPLE 1

A phase-change optical recording medium of the layer structure shown in FIG. 3 was manufactured as below.

At first, a substrate 1 made of a circular transparent resin material of 3.5 inches diameter and 0.6 mm thickness having a central hole and previously formed with grooves at a pitch of 1.0 μm was used, and a first protection layer 2 of 70 nm was formed from a target comprising ZnS–SiO$_2$ (SiO$_2$: 20 mol %) on the transparent substrate 1 by an RF sputtering method. Then, an interface reflection control layer 3 of 5 nm comprising AlN$_x$ was formed by using a target made of Al by a DC sputtering method in a mixed atmosphere of nitrogen and argon. The interface reflection control layer 3 obtained had a refractive index of 2.7 and an extinction coefficient of 1.0 which simultaneously satisfied the equation (4), the equation (5) and the equation (6) in the present invention.

Then, a recording layer 4 of 25 nm was formed from a target comprising Ge—Te—Sb alloy by a DC sputtering method, on which a second protection layer 5 of 10 nm was formed by the same method as the first protection layer 2. Further, a reflection layer 6 comprising an AlTiCr alloy of 150 nm was formed thereon. Then, an UV-curable resin was formed on the reflection layer 6 by a spin coating method.

Figure 1:
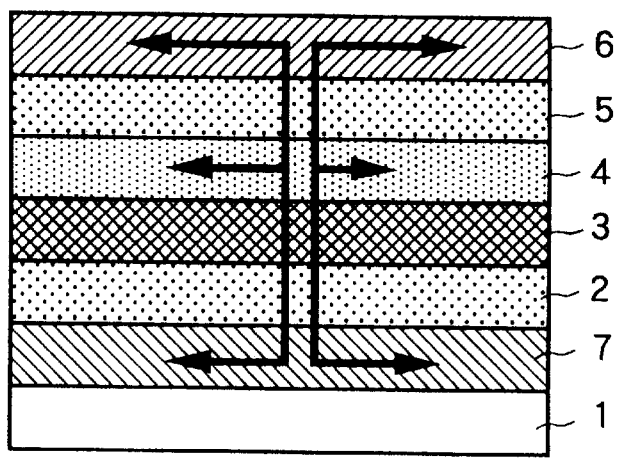
FIG. 1 is an explanatory view schematically illustrating a flow of heat in a phase-change optical recording medium according to the present invention.
Figure 2:
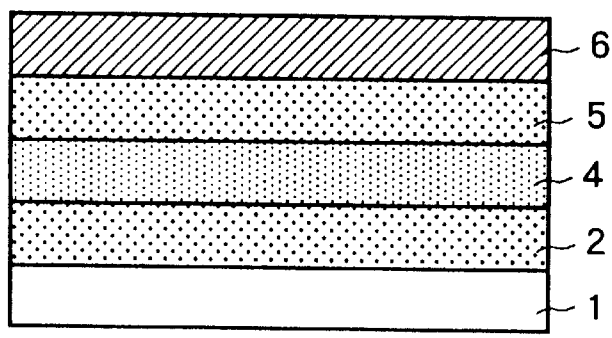
FIG. 2 is a cross sectional view illustrating a layer structure of an existent phase-change optical recording medium.

On the other hand, as a comparative example, a phase-change recording medium of a layer structure comprising a substrate 1, a first protection layer 2, a recording layer 4, a second protection layer 5 and a reflection layer 6 shown in FIG. 2 was manufactured. The method of forming the substrate 1 and each of the layers was identical with that described above, and they were manufactured with the same material with the same thickness, and a UV-curable resin was formed on the reflection layer 6 by the same method.

Each of the samples of the thus obtained recording medium was subjected to a driving device, rotated at 3600 rpm and 1–7 modulation signal by a laser beam at a wavelength of 680 nm was recorded to a position of 39 mm from the center in the radial direction. Recording was conducted by a mark edge method. Then, upon recording 2Tw signals (recording frequency: 12.3 MHz) and overwriting 7Tw signals (recording frequency: 3.5 MHz), jitter (deviation in the direction of time axis) was analyzed by a jitter analyzer to obtain a standard deviation σ.

For each of the samples, Table 4 shows the jitter value obtained (standard deviation σ) and the ratio (σ/Tw) of the jitter value to the Tw (window width). If the ratio (σ/Tw) is about 15% or less, the readout signal is considered satisfactory in view of practical use.

As can be seen from Table 4, in the example of the present invention having the interface reflection control layer 3, σ/Tw=8.58% and a high quality readout signal can be obtained. On the contrary, in the comparative example not having the interface reflection control layer 3, the jitter value is large and σ/Tw=12.5%. Although the value is not more than 15%, it inevitably exceeds 15% due to fluctuation of the laser power, tilt of the disc by warping, uniformity of mediums and the like, and no high quality readout signal can be obtained.

EXAMPLE 2

A phase-change optical recording medium of a layer structure shown in FIG. 11 was manufactured as below.

At first, a first protection layer 2 of 70 nm was formed from a target comprising ZnS–SiO$_2$ (SiO$_2$: 20 mol %) on the same transparent substrate 1 as in Example 1 by an RF sputtering method. Then, a first interface reflection control layer 3a comprising AlN$_x$ of 5 nm was formed by using a target made of Al by a DC sputtering method in a mixed atmosphere of nitrogen and argon. The first interface reflection control layer 3 obtained had a refractive index of 2.7 and an extinction efficient of 1.0 which simultaneously satisfied the equation (7), the equation (8) and the equation (9) in the present invention.

Then, a recording layer 4 of 25 nm was formed from a target comprising a Ge—Te—S.b alloy by a DC sputtering method, on which a second interface reflection control layer 3b of comprising AlN$_x$ of 10 nm was formed by the same method as the first interface reflection control layer 3a. The obtained second interface reflection control layer 3b had a refractive index of 2.7 and an extinction coefficient of 1.0 which simultaneously satisfied the equation (10), the equation (11) and the equation (12) in the present invention. Further, a reflection layer 6 comprising an AlTiCr alloy of 150 nm was formed thereon. Then, an UV-curable resin was formed on the reflection layer 6 by a spin coating method.

On the other hand, as a comparative example, a phase-change recording medium of a layer structure comprising a substrate 1, a first protection layer 2, a recording layer 4, a second protection layer 5 and a reflection layer 6 shown in FIG. 2 was manufactured in the same manner as in Example 1.

Overwriting was conducted to each of the samples of the thus obtained recording medium by the same method as in Example 1, and jitter was measured to obtain a standard deviation σ. For each of the samples, Table 5 shows the jitter value obtained (standard deviation σ) and the ratio (σ/Tw) of the jitter value to Tw (window width).

As can be seen from Table 5, in the example of the present invention having the two interface reflection control layers 3a and 3b, σ/Tw=7.79% and a high quality readout signal can be obtained. On the contrary, in the comparative example not having the interface reflection control layer, the jitter value is large and σ/Tw=12.5%. Although the value is not more than 15%, it inevitably exceeds 15% due to fluctuation of the laser power, tilt of the disc by warping, uniformity of medium and the like, and no high quality readout signal can be obtained.

EXAMPLE 3

A phase-change optical recording medium of a layer structure shown in FIG. 11 was manufactured in the same manner as in Example 2, except for forming a layer of $AlN_x$ of 5 nm thickness having a refractive index of 2.5 and an extinction coefficient of 0.5 which simultaneously satisfied the equation (7), the equation (8) and the equation (9) in the present invention as the first interface reflection control layer 3a.

Overwriting was conducted to the thus obtained samples under the same conditions as those in Example 1, the jitter value after overwriting for the first time (standard deviation σ) and the ratio (σ/Tw) of the jitter value to Tw (window width) were measured in the same manner as described above, and the result of the measurement is shown in Table 6.

Further, each of the values after repeating overwriting under the same conditions for 10,000 cycles is also shown together in Table 6.

As can be seen from Table 6, (σ/Tw) after overwriting for the first time was 8.92% also in this example, and a high quality readout signal could be obtained and σ/Tw=10.3% also after repeated overwriting for 10,000 cycles, which was reduced from 15% by about 5%. Therefore, it was less than 15% although there were fluctuation of laser power, tilt of the disc by warping and uniformity of medium to some extent, to maintain a high quality readout signal.

EXAMPLE 4

A phase-change optical recording medium of a layer structure shown in FIG. 11 was manufactured as below.

At first, a protection layer 2 comprising ZnS and $SiO_2$ of 70 nm thickness was formed by an RF (high frequency) sputtering method on a grooved surface of a polycarbonate substrate 1 of 120 mm diameter and 0.6 mm thickness having a central hole, in which grooves at 1.5 μm pitch (groove width=0.75 μm, groove depth=75 nm) were formed on one surface. As a target, a sintering product prepared by mixing and sintering a ZnS powder and a $SiO_2$ powder at ZnS:$SiO_2$=80:20 (molar ratio) was used.

Then, a first interface reflection control layer 3a of thickness 10 nm comprising $Zn_{(1-x)}S_x$ and $SiO_2$ was formed on the protection layer 2 by an RF sputtering method. As a target, sintering product prepared by mixing and sintering ZnS powder, $SiO_2$ powder and Zn powder at ZnS:$SiO_2$:Zn= 72:18:10 (molar ratio) was used.

Next, a recording layer 4 comprising a $Sb_{22}Te_{54}Ge_{22}$ alloy of 25 nm thickness was formed on the first interface reflection control layer 3a by a DC (direct current) sputtering method. Further, a second interface reflection control layer 3b comprising $Zn_{(1-x)}S_x$ and $SiO_2$ of 20 nm thickness was formed on the recording layer 4 using the same target in the same manner as the first interface reflection control layer 3a.

Finally, a reflection layer 6 comprising an Al alloy of 100 nm was formed on the second interface reflection control layer 3b by a DC sputtering method, and a UV-ray curable resin was coated thereover to a thickness of 10 μm by a spin coating method and then cured.

x value for $Zn_{(1-x)}S_x$ constituting the first interface reflection control layer 3a and the second interface reflection control layer 3b was determined as below.

A fluorescence X-ray measuring apparatus used in Examples is as follows. Measuring conditions are shown in Table 7.

<MEASURING APPARATUS>

Type: PW2400, by Philips Co.

Valve: Rhodium

Mask diameter: 20 mm

For samples to be measured, an existing ratio of sulfur atoms: Y=(S/(ZnS+S)) was measured based on the analysis by the fluorescence-ray apparatus and, also for the film formed from a target prepared by sintering a ZnS powder, the existing ratio of sulfur atoms (S/(ZnS+S)) was measured in the same manner, which was defined as standard value $Y_0$, and calculation was conducted according to the equation (13) described above.

$$x = 0.5 Y/Y_0 \qquad (13)$$

The measured values for x in both of the first interface reflection control layer 3a and the second interface reflection control layer 3b thus obtained were 0.4.

Further, the refractive index n and the extinction coefficient k at a wavelength of 680 nm of the first interface reflection control layer 3a and the second interface reflection control layer 3b were, respectively, 2.3 and 1.1. Further, as a result of measurement of the refractive index n and the extinction coefficient k of the protection layer 2 by the same measurement, they were n=2.1 and k=0.

The thus obtained disc samples were initialized by irradiating with a beam of semiconductor laser at a wavelength of 830 nm, thereby crystallizing the recording layer on the entire surface of the disc. Subsequently, overwriting was conducted by using a optical head having an objective lens with a number of aperture of 0.6 and a wavelength of a semiconductor laser at 680 nm, under the condition of a linear velocity of 6 m/sec. As a recording signal, a random pattern signal formed by modulating a semiconductor laser beam by a 8–16 modulation system was used so that the shortest mark length became 0.615 μm.

After overwriting, reading was conducted by a reading power at 1.0 mW. From the readout signal, a jitter at the trailing end of the recording mark was measured by a jitter analyzer to obtain a standard deviation σ for the jitter. Further, the ratio (σ/Tw) of the obtained jitter (standard deviation σ) to the window width Tw for signal detection was calculated.

As a result, the jitter ratio (σ/Tw) after overwriting for 100 cycles was about 8% which was a satisfactory value. Further, when same measurement was conducted after overwriting for 100,000 cycles, the increment of the jitter was 1% or less and degradation was scarcely observed.

On the other hand, as an comparative example, a sample of a layer structure shown in FIG. 2 was manufactured. That is, the same sample as described above was manufactured except for changing the thickness of the protection layer 2 to 80 nm, not forming the first interface reflection control layer 3a and forming a protection layer 5 with the same material as the protection layer 2 instead of the second interface reflection control layer 3b.

As a result of conducting overwriting also on the sample under the same condition to examine the jitter ratio (σ/Tw), it was 15% after 100 cycles and 20% after 100,000 cycles.

EXAMPLE 5

A phase-change optical recording medium of a layer structure shown in FIG. 3 was manufactured as below.

At first, a protection layer 2 comprising ZnS and $SiO_2$ of 70 nm thickness was formed on a grooved surface of the same polycarbonate substrate 1 as in Example 4 by an RF sputtering method. As a target, a sintered product prepared by mixing and sintering a ZnS powder and an $SiO_2$ powder at $ZnS:SiO_2=80:20$ (molar ratio) was used.

Then, an interface reflection control layer 3 comprising $ZnS_{(1-x)}S_x$ and $SiO_2$ of 10 nm thickness was formed on the protection layer 2 by an RF sputtering method. As a target, a sintered product prepared by mixing and sintering a ZnS powder, an $SiO_2$ powder and a Zn powder at $ZnS:SiO_2:Zn=72:10:10$ (molar ratio) was used.

Then, a recording layer 4 comprising $Sb_{22}Te_{54}Ge_{22}$ alloy of 25 nm was formed on the interface reflection control layer 3 by a DC sputtering method. Further, a protection layer 5 comprising ZnS and $SiO_2$ of 20 nm thickness was formed on the recording layer 4 using the same target in the same manner as the protection layer 2.

Finally, a reflection layer 6 comprising an Al alloy of 100 nm was formed on the protection layer 5 by a DC sputtering method, and UW-ray curable resin 6 was coated thereover to a thickness of 10 μm by a spin coating method and then cured.

As a result of measurement of the recording characteristics for the obtained sample by the same method as in Example 4, the jitter ratio (σ/Tw) after overwriting for 100 cycles was about 8.5% which was a satisfactory value, and the increment after repeating 100,000 cycles was 1% or less, and degradation was scarcely observed.

EXAMPLE 6

A phase-change optical recording medium of a layer structure shown in FIG. 16 was manufactured as below.

At first, a heat diffusion layer 7 comprising aluminum nitride was formed to a thickness of 50 nm on a substrate 1 made of a polycarbonate resin (0.6 mm thickness, 90 mm diameter, with grooves) by sputtering using a target comprising aluminum in an atmospheric gas comprising a gas mixture of an Ar gas and a nitrogen gas. A carbon film was formed to a thickness of 10 nm as an interface reflection control layer 3 on the heat diffusion layer 7 by sputtering using diamond like carbon as a target.

On the interface reflection control layer 3, were formed a recording layer 4 comprising Sb—Te—Ge at a thickness of 25 nm, an upper protection layer 5 comprising a mixed film of ZnS and $SiO_2$ at a thickness of 20 nm thereon and a reflection layer 6 comprising Al to a thickness of 100 nm further thereon successively by a sputtering method. Further, on the reflection layer 6, a UV-curable resin was coated and cured to provide a protection coat.

For comparison, quite the same phase-change optical recording medium as described above was manufactured except for forming a protection layer comprising a mixed film of ZnS and $SiO_2$ to a thickness of 100 nm instead of the heat diffusion layer 7 comprising aluminum nitride.

Each of the samples of the thus manufactured optical information recording medium was irradiated with an Ar ion laser beam from the side of the substrate under rotation thereby making the entire surface of the recording layer 4 into a crystallized state. Subsequently, it was rotated at a rotation speed of 1800 rpm and a semiconductor laser beam at a wavelength of 680 nm was focused through an objective lens to the recording layer (at a radial position of 30 mm) thereby recording signals with an identical power at each of the frequencies from 0.2 to 10 MHz by a mark edge method. The linear velocity was about 5.6 m/s. Further, each of the recorded signals was read with an identical power to measure the signal intensity.

Figure 17:
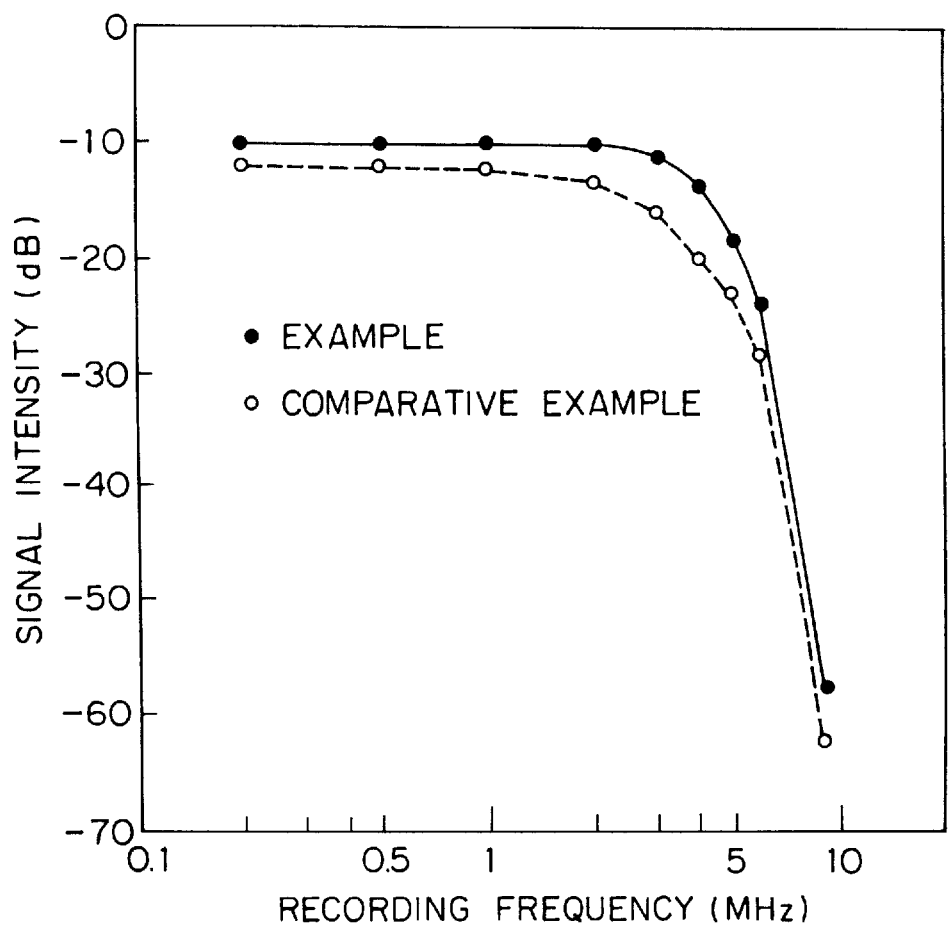
FIG. 17 is a graph showing a relationship between a signal intensity of a readout light and a recording frequency measured in Example 6.

FIG. 17 is a graph showing a relationship between the signal intensity and the recording frequency of the readout light on every samples. As can be seen from the figure, as the recording frequency increases to about 2 MHz or higher, the signal intensity starts to be lowered in the structure of the comparative example, whereas the frequency at which the signal intensity starts to lower is about 2.5 MHz in the structure of the example in which the heat diffusion layer comprising aluminum nitride is disposed.

The signal intensity is lowered as the frequency is higher, because the distance between the recording marks formed becomes shorter to about the same extent as the diameter of the reading beam, thereby deteriorating the spatial resolution. Then, the resolution is different depending on the recording medium even when recording is conducted at an identical frequency, because the size of the marks is different depending on the recording medium. That is, it can be said that in a recording medium having high resolution at an identical frequency, a smaller mark which is similar with a mark length determined by the recording frequency is formed.

From the result of FIG. 17, since the frequency in the example that can provide the same resolution as that at 2 MHz in the comparative example is 2.5 MHz, it can be said that the density in the example is increased by about 1.25 times (=2.5/2) compared with the comparative example.

Figure 18:
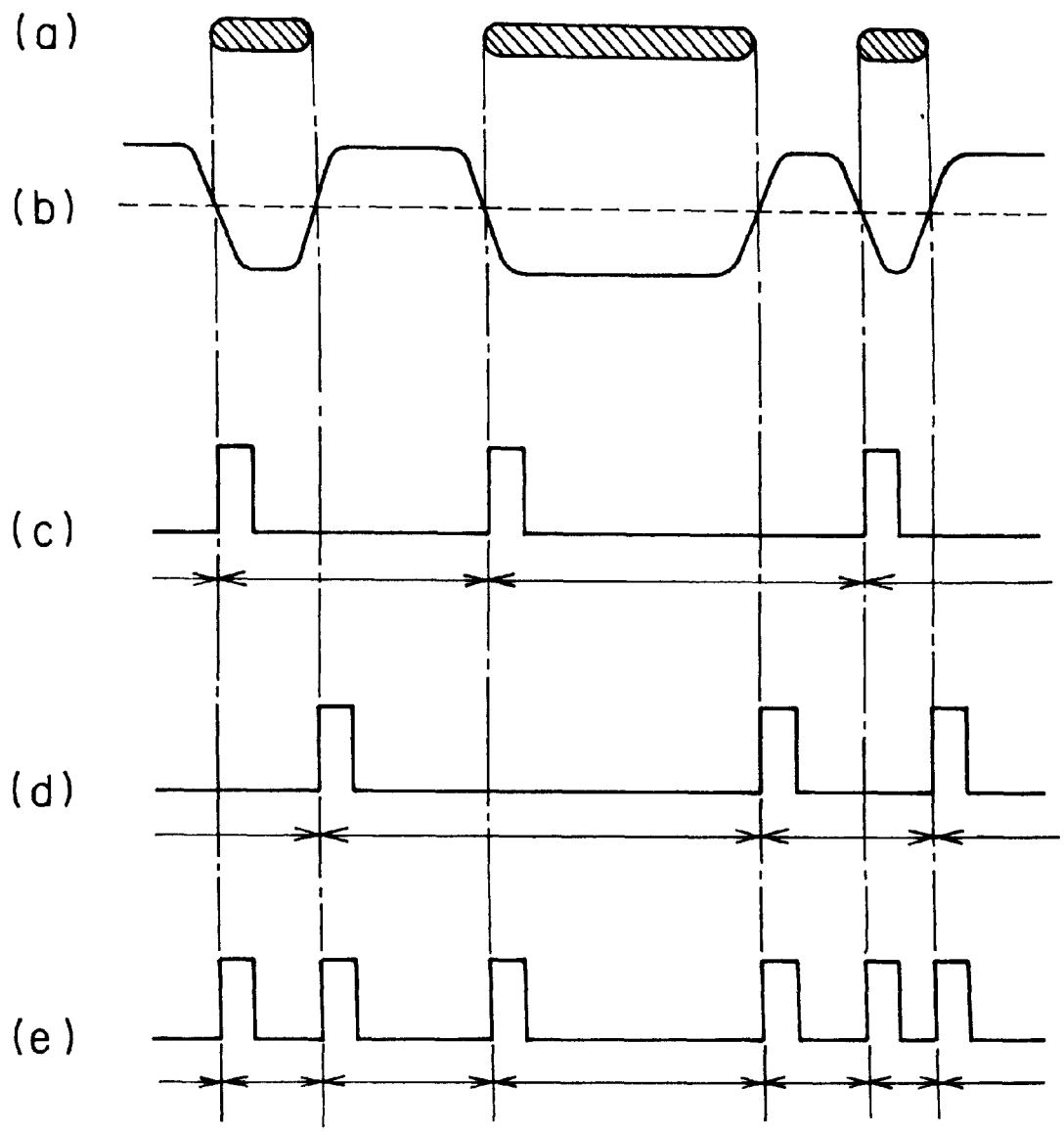
FIG. 18 is a schematic view showing a procedure for obtaining a binarized signal from a reproduced signal in which are shown (a) a recording mark, (b) a readout signal, (c) a binarized signal for a leading edge, (d) a binarized signal for a trailing edge and (e) a binarized signal for both edges, respectively.

Then, the signal at a frequency of 0.5 MHz (mark length= about 5.6 μm) recorded as described above was read and a binarized signal corresponding to a leading edge and a trailing edge of the recording mark was obtained from the readout signal shown in FIG. 18(b). FIG. 18(c) shows a binarized signal for the leading edge and FIG. 18(d) shows a binarized signal for the trailing edge.

A pulse interval was measured from the binarized signals and the standard deviation value of the distribution, namely, a jitter was measured. Time interval analyzer TA320 manufactured by Yokokawa Denki was used for the measurement of the jitter. The jitter is in proportion with the variation of the length and positional displacement of the recording mark in accordance with the definition described above.

The result of measurement is shown in Table 8.

Figure 19A:
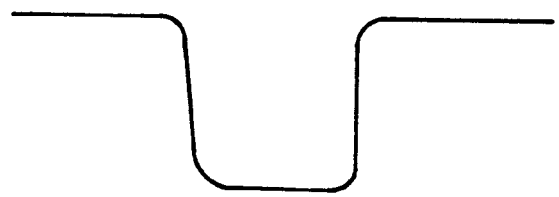
FIG. 19 is a waveform chart of a readout signal observed for each of samples in which (a) is a waveform for a sample, (b) is a waveform for a sample in a comparative example, (c) is a waveform for a sample in a comparative example which is a waveform when a linear velocity upon recording is higher than that in (b).
Figure 19B:
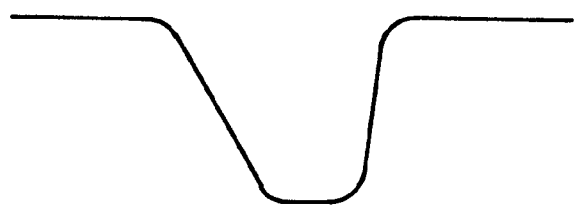
Figure 19C:
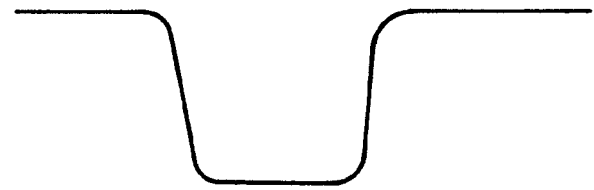

Further, a waveform of the readout signal was observed for each of the samples. The results are shown in FIG. 19. Then, (a) is a waveform for the sample of the example and (b) is a waveform for the sample of the comparative example. Further (c) is a waveform for the readout signal recorded in the same manner as above except for changing the linear velocity of the sample of the comparative example to 15 m/s.

As can be seen from Table 8, while the jitter for the trailing edge has substantially the same value for both of the samples, the jitter for the leading edge in the example is smaller by about ½ compared with that in the comparative example. Namely, the jitter for the leading edge is decreased by providing the heat diffusion layer comprising aluminum nitride.

This is because a tear drop shaped mark tends to be formed by accumulation of heat in the recording layer in a case of forming a long mark if the heat generated in the recording layer is not diffused rapidly to the outside of the recording layer after passage of the recording beam as described above, whereas this can be prevented by disposing the heat diffusion layer. This can be seen also from the result of the observation for the waveform of the readout signal.

That is, as shown in FIG. 19, the waveform of the comparative example shown in (b) is in an asymmetric shape due to the tear drop shape of the recording mark, whereas the waveform of the example shown in (a) is in a symmetric shape. Further, when the difference of the waveform due to the difference of the linear velocity is compared between the linear velocity 5.6 m/s (b) and the linear velocity 15 m/s (c), with respect to the sample of the comparative example, it can be seen that the waveform approaches a symmetrical shape as the linear velocity is increased.

Then, the signal at a frequency of 5.0 MHz recorded as described above (mark length=about 0.56 μm) was read, and a binarized signal corresponding to both edges of the recording mark as shown in FIG. 18(e) was obtained, and the jitter was measured in the same manner as above based thereon. The result of the measurement is also shown together in Table 8.

As can be seen from the result, the jitter in the example was reduced to about ½ compared with the jitter of the comparative example.

The recording mark by the recorded signal has a shorter mark length and a shorter distance between the recording marks to each other as compared with the signal at a frequency of 0.5 MHz described above. However, in the comparative example, since the heat is not diffused rapidly to the outside of the recording layer as described above, heat generated upon forming the just preceding mark transfers to the position for forming the succeeding mark, so that the position for forming the just succeeding mark is displaced forward from the normal position. That is, the length of gap (distance between the trailing edge of the preceding mark and the length edge of the succeeding mark) is shortened. Further the mark length is made longer than the predetermined length by the heat accumulation in the recording layer. Accordingly, the jitter was increased in the comparative example.

On the contrary, in this example, since the deviation for the position of forming the mark is prevented and a small mark as determined was formed by disposing the heat diffusion layer, jitter was decreased.

Figure 16:
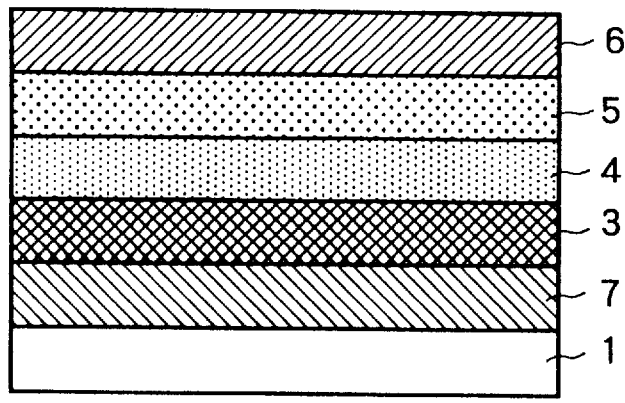
FIG. 16 is a schematic cross sectional view illustrating an embodiment of a phase-change recording medium according to the present invention.

From the foregoing, since the heat diffusion layer 7 is disposed between the interface reflection control layer 3 and the substrate 1 in the phase-change optical recording medium of the layer structure in FIG. 16, the recording mark can be prevented from being formed into a tear drop shape and a small recording mark can be formed with a smaller gap between each of the recording marks as compared with the layer structure of disposing the protection layer comprising the dielectric material instead of the heat diffusion layer 7, so that recording at high density can be conducted precisely by the mark edge recording.

EXAMPLE 7

Figure 20:
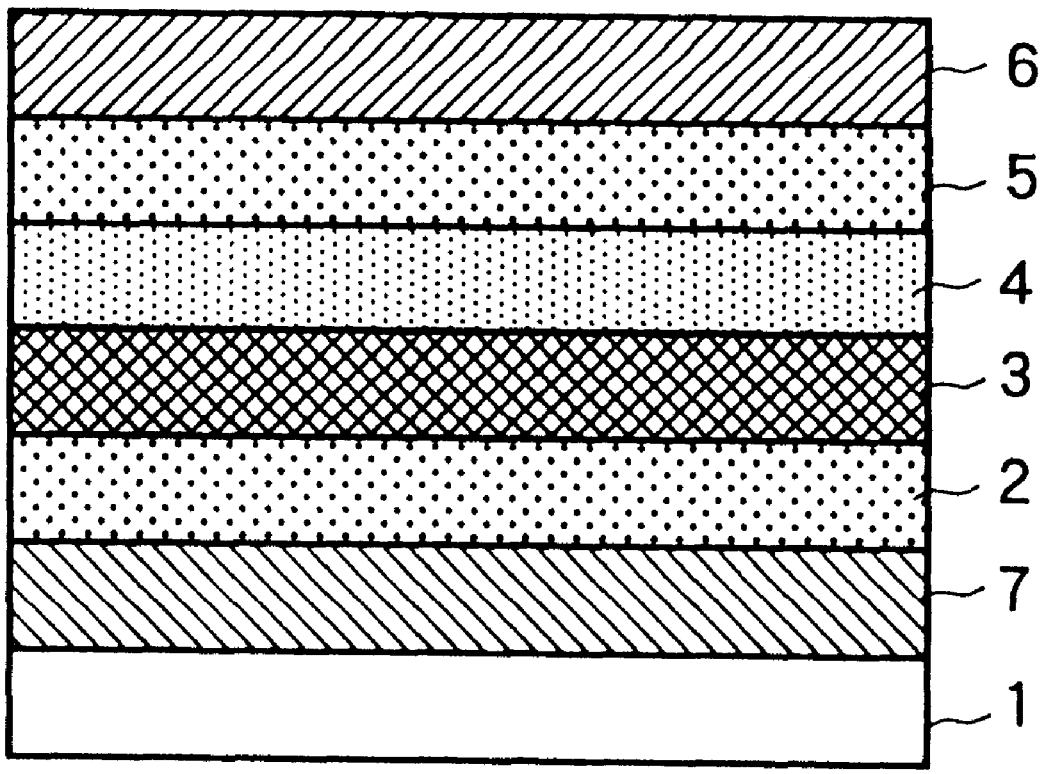
FIG. 20 is a schematic cross sectional view illustrating an embodiment of a phase-change recording medium according to the present invention.

A phase-change optical recording medium of the layer constitution shown in FIG. 20 was manufactured as below.

At first, heat diffusion layer 7 comprising aluminum nitride was formed to a thickness of 50 nm on the same substrate 1 as in the example by sputtering using a target comprising aluminum in an atmospheric gas comprising a gas mixture of an Ar gas and a nitrogen gas. A lower protection layer 2 comprising a film of mixture of ZnS and $SiO_2$ was formed to a thickness of 100 nm on the h eat diffusion layer 7 and a carbon film was formed as an interface reflection control layer 3 to a thickness of 5 nm on the lower protection layer 2, respectively, by a sputtering method.

On the interface reflection control layer 3, were formed a recording layer 4 comprising Sb—Te—Ge at a thickness of 25 nm, an upper protection layer 5 comprising a film of mixture of ZnS and $SiO_2$ at a thickness of 20 nm thereon, and a reflection layer 6 comprising Al to a thickness of 100 nm further thereon, respectively, by a sputtering method successively. Further, on the reflection layer 6, a UV-curable resin was coated and cured to provide a protection coat.

Further, a phase-change optical recording medium was also manufactured with the same layer structure except for the heat diffusion layer 7, by forming boron nitride, silicon nitride, titanium nitride, carbonn, silicon carbide, titanium carbide, tantalum carbide, tungsten carbide, aluminum oxide, magnesium oxide, zirconium borides and $MoSi_2$, respectively, instead of aluminum nitride, as the heat diffusion layer 7 at the same thickness by a sputtering method.

Each of the samples thus manufactured was initialized by Ar laser in the same method as in Example 6. Subsequently, after recording a random pattern signal of a 1–7 RLL modulation system, when the jitter of the readout signal was measured, it was found that the ratio (σ/Tw) of the jitter (σ) to the window width (Tw) was 10% or less in all of the samples, to obtain a good readout signal.

Further, after overwriting the identical signal for 100,000 cycles, when the jitter was measured in the same manner, the ratio (σ/Tw) of the jitter (σ) to the window width (Tw) was 15% or less in all of the samples. Namely, it was found that positional deviation for forming the recording mark and the deviation from the predetermined shape were kept low even by the repetitive overwriting for a number of cycles and it was found that relatively good reading characteristic could be obtained.

That is, in the phase-change optical medium of this layer structure, recording at high density can be conducted precisely by the mark edge recording.

TABLE 1

|  | Refractive index (n) | Extinction coefficient (k) | Film thickness (nm) |
|---|---|---|---|
| First protection layer | 2.12 | 0.0 | 70 |
| Interface reflection control layer | 0.25–5.0 | 0.0–5.0 | 5 |
| Recording layer Amorphous state | 4.3 | 1.64 | 25 |
| Recording layer Crystalline state | 4.4 | 4.33 | 25 |

TABLE 1-continued

| | Refractive index (n) | Extinction coefficient (k) | Film thickness (nm) |
|---|---|---|---|
| Second protection layer | 2.12 | 0.0 | 10 |
| Reflection layer | 2.44 | 3.6 | 150 |

TABLE 2

| | Refractive index (n) | Extinction coefficient (k) | Film thickness (nm) |
|---|---|---|---|
| First protection layer | 2.12 | 0.0 | 70 |
| First interface reflection control layer | 0.25–5.0 | 0.0–5.0 | 5 |
| Recording layer Amorphous state | 4.3 | 1.64 | 25 |
| Recording layer Crystalline state | 4.4 | 4.33 | 25 |
| Second interface reflection layer | 2.70 | 1.0 | 10 |
| Reflection layer | 2.44 | 3.6 | 150 |

TABLE 3

| | Refractive index (n) | Extinction coefficient (k) | Film thickness (nm) |
|---|---|---|---|
| Protection layer | 2.12 | 0.0 | 70 |
| First interface reflection control layer | 2.50 | 0.5 | 5 |
| Recording layer Amorphous state | 4.3 | 1.64 | 25 |
| Recording layer Crystalline state | 4.4 | 4.33 | 25 |
| Second interface reflection layer | 0.25–5.0 | 0.0–5.0 | 5 |
| Reflection layer | 2.44 | 3.6 | 150 |

TABLE 4

| | Jitter value (ns) | σ/Tw (%) |
|---|---|---|
| Example | 1.75 | 8.58 |
| Comp. Example | 2.55 | 12.5 |

TABLE 5

| | Jitter value (ns) | σ/Tw (%) |
|---|---|---|
| Example | 1.59 | 7.79 |
| Comp. Example | 2.55 | 12.5 |

TABLE 6

| | Jitter value (ns) | σ/Tw (%) |
|---|---|---|
| After overwriting for once | 1.82 | 8.92 |
| After overwriting for 10,000 | 2.10 | 10.3 |

TABLE 6-continued

| | Jitter value (ns) | σ/Tw (%) |
|---|---|---|
| cycles | | |

TABLE 7

| Element | Exciting condition | Slit width | Detector | Spectralized crystal |
|---|---|---|---|---|
| Si | 24 kv, 125 mA | 0.3 mm | FL | InSb |
| Zn | 60 kv, 50 mA | 0.1 mm | DU | LiF200 |
| S | 24 kv, 125 mA | 0.3 mm | FL | Ge |

TABLE 8

| | Jitter (nsec) | | |
|---|---|---|---|
| | Leading edge | Trailing edge | Both edges |
| Example | 3.7 | 2.7 | 3.0 |
| Comp. Example | 6.9 | 3.2 | 6.4 |

INDUSTRIAL APPLICABILITY

As has been described above, according to the method of designing the phase-change optical recording medium of the present invention, it is possible to increase the ratio (Ac/Aa) of light absorption rate in the crystalline state relative to the light absorption rate in the amorphous state of the recording layer to 1.2 or higher and increase the optical contrast to 20% or higher by defining the difference of the interface reflection intensity ratio on the laser beam incident side of the light recording layer between the amorphous state and the crystalline state to a predetermined range. Therefore, the phase-change optical recording medium designed by this method can provide a high quality readout signal in recording by overwriting.

Further, since the phase-change recording medium of the present invention can increase the ratio (Ac/Aa) of light absorption rate in the crystalline state relative to the light absorption rate in the amorphous state of the recording layer to 1.2 or higher and increase the optical contrast to 20% or higher by disposing the interface reflection control layer having a refractive index and an extinction coefficient within a predetermined range at least just beneath the recording layer in accordance with the designing method described above, a high quality readout signal can be obtained in the recording by overwriting.

Further, a higher ratio (Ac/Aa) of light absorption rate can be obtained and, at the same time, the interface reflection control layer just beneath the recording layer (first interface reflection control layer) can be constituted with a material having higher refractive index, by disposing the same interface reflection control layer also just above the recording layer (second interface reflection control layer).

Further, in the phase-change recording medium according to the present invention, heat generated in the recording layer is rapidly diffused by disposing the heat diffusion layer comprising a specific material of high thermal conductivity between the interface reflection control layer disposed in adjacent with the interface of the recording layer on the laser beam incident side and the substrate. This can reduce the deviation of the position for forming the mark from a normal position and form a mark with small distortion also in a case of recording at high density. Therefore, the phase-change optical recording medium can particularly provide a high quality readout signal and has high cyclability and is suitable to recording at high density in over-write recording.

What is claimed is:

1. A phase-change recording medium having a recording layer comprising an alloy comprising at least Ge, Sb and Te in which phase change occurs reversibly between a crystalline state and an amorphous state in accordance with the intensity of an irradiated laser beam and a substrate for supporting the recording layer, and conducting recording, erasing and reading of information by irradiation of laser beam, wherein an interface reflection control layer constituted with a material having a refractive index n and an extinction coefficient k simultaneously satisfying the following equation (4), equation (5) and equation (6) is disposed at the interface of the recording layer on the laser beam incident side:

$$k \geq 0.22n + 0.14 \quad (4)$$

$$k < 0.88n - 0.19 \quad (5)$$

$$n \leq 2.8 \quad (6).$$

2. A phase-change recording medium as defined in claim 1, wherein the interface reflection control layer is constituted with at least one material selected from the group consisting of oxide, sulfide, nitride, carbide and fluoride of metal, semimetal or semiconductor, which is a non-stoichiometric compound deficient in oxygenn, sulfur, nitrogen, carbon and fluorine.

3. A phase-change recording medium as defined in claim 1, wherein the interface reflection control layer comprises a non-stoichiometric compound deficient in sulfur in zinc sulfide, a non-stoichiometric compound deficient in nitrogen in aluminum nitride, or a non-stoichiometric compound deficient in carbon in silicon carbide.

4. A phase-change recording medium as defined in claim 1, wherein a protection layer comprising a dielectric material is disposed between the interface reflection control layer disposed in adjacent with the interface of the recording layer on the laser beam incident side and a substrate.

5. A phase-change recording medium as defined in claim 1, wherein a heat diffusion layer consisting of material selected from the group comprising of aluminum nitride, boron nitride, silicon nitride, titanium nitride, carbonn, silicon carbide, titanium carbide, tantalum carbide, tungsten carbide, aluminum oxide, magnesium oxide, zirconium borides, MoSi2, metal, semimetal or semiconductor is disposed between the interface reflection control layer disposed in adjacent with the interface of the recording layer on the laser beam incident side and the substrate.

6. A phase-change recording medium having a recording layer comprising an alloy comprising at least Ge, Sb and Te in which phase change occurs reversibly between a crystalline state and an amorphous state in accordance with the intensity of an irradiation of laser beam and a substrate for supporting the recording layer, and conducting recording, erasing and reading of information by irradiation of laser beam, wherein interface reflection control layers are disposed just beneath and just above the recording layer, a first interface reflection control layer disposed on the laser beam incident side of the recording layer is constituted with a material having a refractive index $ni_1$ and an extinction coefficient $ki_1$ simultaneously satisfying the following equation (7), equation (8) and equation (9), and a second interface reflection control layer disposed on the side of the recording layer opposite to the laser beam incident side is constituted with a material having a refractive index $ni_2$ and an extinction coefficient $ki_2$ simultaneously satisfying the following equation (10), equation (11), and equation (12):

$$Ki_1 \leq 0.15 ni_1 \quad (7)$$

$$Ki_1 \leq 0.6 ni_1 \quad (8)$$

$$ni_1 \leq 3.0 \quad (9)$$

$$Ki_2 \geq 0.35 \quad (10)$$

$$Ki_2 \leq 1.06 ni_2 + 0.25 \quad (11)$$

$$Ki_2 \geq ni_2 - 3.8 \quad (12).$$

7. A phase-change recording medium as define in claim 6, wherein the interface reflection control layer is constituted with at least one material selected from the group consisting of oxide, sulfide, nitride, carbide and fluoride of metal, semimetal or semiconductor, which is a non-stoichiometric compound deficient in oxygenn, sulfur, nitrogen, carbon and fluorine.

8. A phase-change recording medium as defined in claim 6, wherein the interface reflection control layer comprises a non-stoichiometric compound deficient in sulfur in zinc sulfide, a non-stoichiometric compound deficient in nitrogen in aluminum nitride, or a non-stoichiometric compound deficient in carbon in silicon carbide.

9. A phase-change recording medium as defined in claim 6, wherein a protection layer comprising a dielectric material is disposed between the interface reflection control layer disposed in adjacent with the interface of the recording layer on the laser beam incident side and a substrate.

10. A phase-change recording medium as defined in claim 6, wherein a heat diffusion layer consisting of material selected from the group comprising of aluminum nitride, boron nitride, silicon nitride, titanium nitride, carbonn, silicon carbide, titanium carbide, tantalum carbide, tungsten carbide, aluminum oxide, magnesium oxide, zirconium borides, MoSi2, metal, semimetal or semiconductor is disposed between the interface reflection control layer disposed in adjacent with the interface of the recording layer on the laser beam incident side and the substrate.

11. A method of designing a phase-change recording medium having a recording layer comprising an alloy comprising at least Ge, Sb and Te in which phase-change occurs reversibly between a crystalline state and an amorphous state in accordance with the intensity of an irradiated laser beam and a substrate for supporting the recording layer, and conducting recording, erasing and reading of information by irradiation of laser beam, wherein the intensity ratio of a reflection wave to an incident wave at the interface of the recording layer on the laser beam incident side in a case where the recording layer is in a crystalline state and in an amorphous state (Rra: in a case where the recording layer is in an amorphous state, Rrc: in a case where the recording layer is in a crystalline state) simultaneously satisfy the following equation (1), equation (2) and equation (3):

$$Rra - Rrc \leq -0.2 \quad (1)$$

$$Rra - 0.9 \times Rrc \leq 0.05 \quad (2)$$

$$Rra + Rrc \geq 0.18 \quad (3).$$

* * * * *